(12) United States Patent
Webb et al.

(10) Patent No.: US 10,206,078 B2
(45) Date of Patent: *Feb. 12, 2019

(54) GROUP BASED PDCCH CAPABILITY FOR LTE

(71) Applicant: SONY CORPORATION, Tokyo (JP)

(72) Inventors: Matthew William Webb, London (GB); Hideji Wakabayashi, Reading (GB)

(73) Assignee: SONY CORPORATION, Tokyo (JP)

( * ) Notice: Subject to any disclaimer, the term of this patent is extended or adjusted under 35 U.S.C. 154(b) by 501 days.

This patent is subject to a terminal disclaimer.

(21) Appl. No.: 14/431,108

(22) PCT Filed: Dec. 2, 2013

(86) PCT No.: PCT/GB2013/053190
§ 371 (c)(1),
(2) Date: Mar. 25, 2015

(87) PCT Pub. No.: WO2014/087147
PCT Pub. Date: Jun. 12, 2014

(65) Prior Publication Data
US 2015/0245350 A1 Aug. 27, 2015

(30) Foreign Application Priority Data

Dec. 3, 2012 (GB) .................................. 1221717.0
Dec. 3, 2012 (GB) .................................. 1221729.5

(51) Int. Cl.
*H04W 4/70* (2018.01)
*H04L 5/00* (2006.01)
(Continued)

(52) U.S. Cl.
CPC ............. *H04W 4/70* (2018.02); *H04L 5/0007* (2013.01); *H04L 5/0053* (2013.01);
(Continued)

(58) Field of Classification Search
None
See application file for complete search history.

(56) References Cited

U.S. PATENT DOCUMENTS 9,496,999 B2 * 11/2016 Ji ....................... H04W 72/1263
9,544,887 B2 * 1/2017 Kim ........................ H04L 5/001
(Continued)

FOREIGN PATENT DOCUMENTS

CN 102387598 A 3/2012
CN 102547738 A 7/2012
(Continued)

OTHER PUBLICATIONS

U.S. Appl. No. 14/429,210, filed Mar. 18, 2015, Matthew William Webb, et al.
(Continued)

*Primary Examiner* — Hicham B Foud
(74) *Attorney, Agent, or Firm* — Xsensus LLP

(57) ABSTRACT

A group-based PDCCH capability in LTE. Information common to a group of UEs, such as those common to a virtual carrier, may be signalled in a group search space within the PDCCH. This common information may include the location of a further control region embedded in the virtual carrier which contains UE-specific information for access the resources of the virtual carrier. Additional methods assign UEs a group identity by implicit signalling, and determine an aggregation level of the group-based PDCCH search space.

21 Claims, 12 Drawing Sheets

(51) Int. Cl.
  *H04W 8/18* (2009.01)
  *H04W 28/12* (2009.01)
  *H04W 72/04* (2009.01)
  *H04L 29/12* (2006.01)
  *H04W 4/06* (2009.01)
  *H04W 72/00* (2009.01)

(52) U.S. Cl.
  CPC ........... *H04L 61/2069* (2013.01); *H04W 4/06* (2013.01); *H04W 8/186* (2013.01); *H04W 28/12* (2013.01); *H04W 72/005* (2013.01); *H04W 72/042* (2013.01); *H04W 72/0446* (2013.01); *H04L 5/0044* (2013.01); *H04L 5/0064* (2013.01); *H04L 5/0094* (2013.01); *Y02D 70/126* (2018.01); *Y02D 70/20* (2018.01)

(56) References Cited

U.S. PATENT DOCUMENTS

| | | | | |
|---|---|---|---|---|
| 9,622,235 | B2* | 4/2017 | Lee | H04W 72/042 |
| 2011/0170496 | A1 | 7/2011 | Fong et al. | |
| 2011/0249633 | A1* | 10/2011 | Hong | H04L 5/0053 |
| | | | | 370/329 |
| 2011/0268046 | A1 | 11/2011 | Choi et al. | |
| 2011/0274066 | A1* | 11/2011 | Tee | H04L 5/001 |
| | | | | 370/329 |
| 2012/0155413 | A1* | 6/2012 | Liu | H04L 1/1861 |
| | | | | 370/329 |
| 2012/0250551 | A1* | 10/2012 | Sartori | H04W 48/12 |
| | | | | 370/252 |
| 2013/0114525 | A1* | 5/2013 | Ahmadi | H04L 5/0053 |
| | | | | 370/329 |
| 2013/0114534 | A1* | 5/2013 | Ji | H04W 72/0406 |
| | | | | 370/329 |
| 2013/0128826 | A1* | 5/2013 | Lin | H04L 1/1861 |
| | | | | 370/329 |
| 2013/0142142 | A1* | 6/2013 | McBeath | H04W 72/042 |
| | | | | 370/329 |
| 2013/0150109 | A1 | 6/2013 | Takano | |
| 2013/0195067 | A1* | 8/2013 | Khoshnevis | H04L 5/0094 |
| | | | | 370/330 |
| 2013/0294389 | A1 | 11/2013 | Hong et al. | |
| 2014/0050192 | A1* | 2/2014 | Kim | H04L 5/001 |
| | | | | 370/329 |
| 2014/0112280 | A1* | 4/2014 | Lee | H04W 72/04 |
| | | | | 370/329 |
| 2014/0133367 | A1* | 5/2014 | Chen | H04L 5/16 |
| | | | | 370/279 |
| 2014/0161088 | A1* | 6/2014 | Seo | H04L 5/0044 |
| | | | | 370/329 |
| 2014/0328312 | A1* | 11/2014 | Seo | H04L 1/1861 |
| | | | | 370/329 |
| 2014/0348093 | A1* | 11/2014 | Ihm | H04L 5/0048 |
| | | | | 370/329 |
| 2015/0003360 | A1* | 1/2015 | Liu | H04L 5/001 |
| | | | | 370/329 |

FOREIGN PATENT DOCUMENTS

| | | |
|---|---|---|
| CN | 102624489 A | 8/2012 |
| GB | 2487757 A | 8/2012 |
| GB | 2487780 A | 8/2012 |
| GB | 2487782 A | 8/2012 |
| GB | 2487906 A | 8/2012 |
| GB | 2487907 A | 8/2012 |
| GB | 2487908 A | 8/2012 |
| GB | 2487909 A | 8/2012 |
| GB | 2488513 A | 9/2012 |
| GB | 2493703 A | 2/2013 |
| GB | 2497743 A | 6/2013 |
| WO | WO 2012/046506 A1 | 4/2012 |
| WO | WO 2013/019088 A2 | 2/2013 |

OTHER PUBLICATIONS

International Search Report dated Apr. 9, 2014 in PCT/GB2013/053190 Filed Dec. 2, 2013.
Search Report dated May 4, 2013 in Great Britain Patent Application No. GB1221729.5 Filed Dec. 3, 2012.
"Digital cellular telecommunications system (Phase 2+)", ETSI TS 122 368, Version 10.5.0, Release 10, Jul. 2011, pp. 1-17 and Cover Page.
"Review of approaches for bandwidth reduction for low complexity MTC LTE UEs", IPWireless Inc., 3GPP TSG RAN WG1 Meeting #67, R1-114267, XP050562333, Nov. 2011, 5 Pages.
"Aggregation levels of ePDCCH for localized and distributed transmission", Huawei, HiSilicon, 3GPP TSG RAN WG1 Meeting #70, R1-123121, XP050661015, Aug. 2012, 2 Pages.
"Effect of restricting maximum transport block size on eNodeB rate control", General Dynamics Broadband, 3GPP TSG-RAN1#70bis, R1-124517, Oct. 2012, 4 Pages.
U.S. Appl. No. 14/442,179, filed May 12, 2015, Webb, et al.
U.S. Appl. No. 14/442,149, filed May 12, 2015, Webb, et al.

* cited by examiner

MAC RAR, from TS 36.321 ('R' = reserved).

GROUP BASED PDCCH CAPABILITY FOR LTE

CROSS-REFERENCE TO RELATED APPLICATIONS

The present application is based on PCT/GB 2013/053190 filed Dec. 2, 2013, and claims priority to British Patent Application 1221717.0, filed in the UK IPO on 3 Dec. 2012 and British patent application 1221729.5, filed 3 Dec. 2012, the entire contents of each of which being incorporated herein by reference.

BACKGROUND OF THE INVENTION

The present invention relates to methods, systems and apparatus for transmitting data to and/or receiving data from mobile terminals in a wireless communications system.

Embodiments of the present invention can for example allocate transmission resources for, and transmit control data to, groups of machine type communication (MTC) devices in cellular telecommunications networks having orthogonal frequency division multiplex (OFDM) based radio access technology (such as WiMAX and LTE).

Certain classes of telecommunications device, such as MTC devices (e.g. semi-autonomous or autonomous wireless communication terminals), support "low capability" communication applications that are characterised, for instance, by the transmission of small amounts of data at relatively infrequent intervals. MTC devices are constructed so that individually they represent little burden on telecommunications networks and thus can be deployed in greater numbers than equivalent "full capability" terminals in the same networks.

In many scenarios, it is preferable to provide terminals dedicated to such "low capability" communication applications with a simple receiver unit (or transceiver unit) having capabilities more commensurate with the amount of data likely to be transmitted to (or from) the terminal. This more limited capability contrasts with the capabilities of the conventional mobile telecommunications terminals, such as smartphones, which share access to the same telecommunications networks.

To support MTC terminals, it has been proposed to introduce a "virtual carrier" operating within a bandwidth of one or more "host carriers": the proposed virtual carrier concept preferably integrates within the transmission resources of conventional OFDM based radio access technologies and subdivides frequency spectrum in a similar manner to OFDM. Unlike data transmitted on a conventional OFDM type downlink carrier, data transmitted on the virtual carrier can be received and decoded without needing to process the full bandwidth of the downlink OFDM host carrier. Accordingly, data transmitted on the virtual carrier can be received and decoded using a reduced complexity receiver unit: with concomitant benefits such as reduced complexity, increased reliability, reduced form-factor and lower manufacturing cost.

The virtual carrier concept is described in a number of co-pending patent applications (including GB 1101970.0 [2], GB 1101981.7 [3], GB 1101966.8 [4], GB 1101983.3 [5], GB 1101853.8 [6], GB 1101982.5 [7], GB 1101980.9 [8] and GB 1101972.6 [9]), the contents of which are incorporated herein by reference.

In one implementation of the virtual carrier (VC) concept, described in co-pending patent application GB 1121767.6 [11], VC capable MTC devices are presumed to receive only certain OFDM symbols across all host carrier (HC) sub-carriers (the HC control region)—the remaining OFDM symbols are typically received across one of a plurality of VC bandwidth ranges. The VC provides dedicated VC control regions amongst the symbols received across the VC bandwidth range.

In conventional LTE, at least some of the resource elements (REs) comprising this HC control region are defined by specification to form a number of so-called control channel elements (CCEs). A physical downlink control channel (PDCCH), for providing control information to devices, comprises a number of CCEs. The number of CCEs comprising a particular PDCCH depends on the aggregation level determined by the eNodeB (see later for discussion of aggregation levels). A UE must search through some number of the CCEs in the control region to determine if there are any that comprise PDCCHs containing control information pertinent to the UE. Some CCEs are searched by all UEs, these CCEs comprising a so-called common search space (CSS), and some CCEs are not searched by all UEs, these CCEs comprising a so-called UE-specific search space (UESS). A CCE may be part of more than one search space. Typically, PDCCHs comprising CCEs in the common search space contain information relevant to all UEs in a cell and PDCCHs comprising CCEs in a UE-specific search space contain information relevant only to one UE.

The HC control region has a limited number of REs and this limitation may restrict the number of MTC devices that may be deployed: since each MTC device requires a corresponding UESS. It is predicted that the number of MTC devices will increase markedly in the coming years and the limitation on REs in LTE can be expected to restrict many MTC scenarios.

An efficient operation of a wireless telecommunications system for MTC devices is therefore desirable.

SUMMARY OF THE INVENTION

According to a first aspect of the invention there is provided a wireless communications system for transmitting data to and/or receiving data from mobile terminals, the wireless communications system comprising:

one or more base stations, each of which includes a transmitter and a receiver configured to provide a wireless access interface for communicating data to and/or from the mobile terminals, the wireless access interface providing a plurality of communications resource elements across a first frequency range, wherein the wireless access interface provided by the one or more base stations includes a plurality of time divided sub-frames, and at least one of the sub-frames includes:

a first control region in a first part of the sub-frame for communicating first signalling information to one or more of the mobile terminals, the first control region including a plurality of control channel resource elements, a first subset of said control channel resource elements providing a group control channel, the group control channel being associated with a group identifier and at least partially encoded using the group identifier; and a second control region in a second part of the sub-frame, distinct from the first part of the sub-frame occupied by the first control region, the second control region being for communicating second signalling information to a predetermined group of the mobile terminals, and wherein the group control channel contains information indicative of the location of the second control region, said information being accessible by applying the group identifier to the group control channel and each of the predetermined group of mobile terminals using the same group identifier.

The wireless communications system therefore implements a group-based control channel capability (the group search space) which transmits information common to a group of UEs, such as those common to a virtual carrier. This includes in particular the location of a further control region which may be embedded in the virtual carrier which contains UE-specific information for providing access to the resources of the virtual carrier.

The potential capacity problem in the host carrier control region (i.e. the physical downlink control channel (PDCCH)) in an MTC scenario identified above is thus addressed by allowing information common to a group of UEs, but not intended for broadcast to all UEs, to be signalled efficiently on PDCCH in a new group-specific search space (GSS). This makes more efficient use of PDCCH capacity without imposing an unnecessary processing load on non-VC UEs.

Various further aspects and embodiments of the invention, including mechanisms for assigning a group identity to UEs by implicit signalling and for determining the aggregation level of a group-based PDCCH search space, are provided in the accompanying independent and dependent claims.

It will be appreciated that features and aspects of the invention described above in relation to the first and other aspects of the invention are equally applicable to, and may be combined with, embodiments of the invention according to the different aspects of the invention as appropriate, and not just in the specific combinations described above. Furthermore features of the dependent claims may be combined with features of the independent claims in combinations other than those explicitly set out in the claims.

BRIEF DESCRIPTION OF DRAWINGS

Embodiments of the present invention will now be described by way of example only with reference to the accompanying drawings where like parts are provided with corresponding reference numerals and in which.

DETAILED DESCRIPTION

Figure 4:
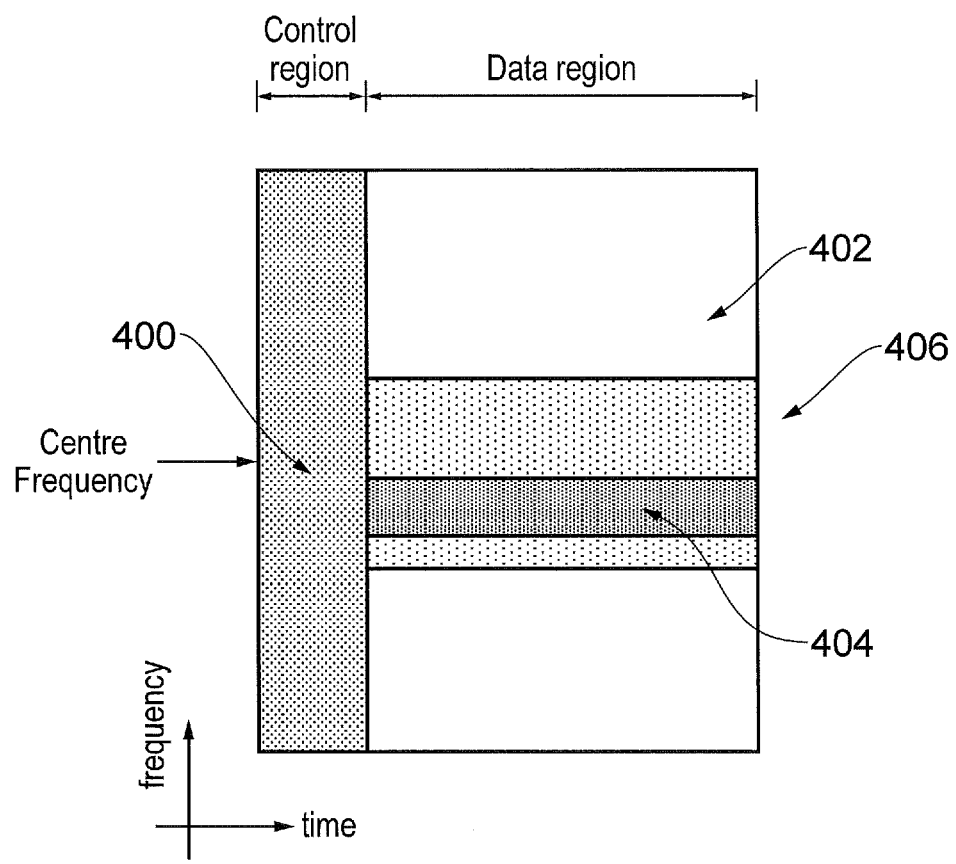
FIG. 4 provides a schematic diagram illustrating an example of a LTE downlink radio sub-frame in which a narrow band virtual carrier has been inserted at the centre frequency of the host carrier, the virtual carrier region abuts the wideband PDCCH control region of the host carrier—making a characteristic "T-shape"

Previous co-pending applications have discussed in detail the design and operation of some parts of a so-called virtual carrier (VC), embedded in a classical host carrier (HC), suitable for use particularly in LTE networks serving machine-type communication (MTC) devices among their mix of user equipment terminals (UEs). One particular version of the VC design is a so-called 'T-shaped' VC, a fuller description of which may be found in co-pending patent application number GB 1121767.6 [11]. A structure for this is illustrated in FIG. 4. In such a VC, the VC-UE is assumed to be able to decode the wideband control region on the HC, but is thereafter confined to relatively narrowband resources for physical downlink shared channels (PDSCH), etc. on the VC.

The control region defined in current releases of LTE includes the PCFICH, PHICH, PDCCH and reference signals (RS). Of interest here is the physical downlink control channel (PDCCH). A UE must search through the control region to find two sets of information carried on PDCCH: a first set that is broadcast to all UEs, and a second set that is intended for the UE alone. This searching is done by "blindly decoding" all possible locations and combinations of resource elements (REs) that could form the UE's PDCCH, and the channel specifications define how the REs should be combined into PDCCH candidates.

The procedure for searching all possible PDCCH candidates is termed "blind decoding" as no information is provided in advance that would allow a more targeted search.

This means that all UEs scheduled in one subframe must have their respective control information embedded in the control region. With a large number of UEs, such as may arise in MTC scenarios, there could be the possibility of insufficient resource available to assign each scheduled UE a PDCCH in the control region of one subframe.

In LTE, the identifier used to direct data to any given UE is known as a Radio Network Temporary Identifier. Depending upon the context within a communication session, the RNTI may take one of a number of forms. Thus data that is UE specific uses either a C-RNTI (cell RNTI) or a temporary C-RNTI; data intended for broadcast of system information uses a SI-RNTI (system information RNTI); paging signals use a P-RNTI (paging RNTI); messages concerning the random access procedure (RA procedure) use RA-RNTI (random access RNTI), etc. The C-RNTI thus uniquely identifies a UE in a cell. RNTIs are assigned from a range of 16-bit values, and specifications restrict which RNTIs may be taken from which ranges within the total possible range. Some values are not permitted for use as any RNTI, referred to in this description as 'reserved RNTIs'. In current versions of specifications, these are the range FFF4 to FFFC inclusive, in hexadecimal notation.

A UE determines whether a particular PDCCH within the control region is intended for itself by attempting to decode each possible set of REs that could be a PDCCH, according to the specifications and the eNB configuration. In LTE, each RRC-connected UE is assigned a 16-bit C-RNTI, which allows a maximum of about 65000 users to be RRC connected. The assigned C-RNTI (or other UE ID) is used to uniquely address control information to specific UEs in the cell. To reduce signalling overhead, the UE ID will not be sent explicitly. Instead, part of the PDCCH data intended for the UE is scrambled (masked) with a mask uniquely associated with the UE ID by the eNodeB (or other network access entity). In a particular example, the CRC bits (cyclic redundancy checking bits—primarily used in error correction procedures) are scrambled using the C-RNTI.

PDCCH data scrambled with the UE's own C-RNTI may only be de-scrambled with that same C-RNTI. Thus, in the example, each UE descrambles the received CRC bits with its own mask before doing a CRC check.

C-RNTIs are assigned to UEs by the network during the random access (RA) procedure. A similar process is conducted to locate any broadcast information, which has CRC scrambled by a common RNTI known to all UEs in the cell, such as the P-RNTI or the SI-RNTI.

In the absence of a separate UE identifier, 2G and 3G technologies seek to identify UEs by reference to the International Mobile Subscriber Identity (IMSI)—strictly, the IMSI is a subscriber identifier often associated with subscriber identification module cards ("SIMs"). The IMSI is still a feature of LTE technologies and, where a single SIM is present in each UE, the IMSI may be used as a further identifier of the UE within the cell.

Control information is packaged for transmission over the PDCCH in standardised Downlink Control Information (DCI) messages—these DCI messages take different formats depending upon their purpose. DCI formats include: uplink grant signals; downlink shared channel resource allocation signals; Transmit Power Control (TPC) commands, which adapt the transmit power of the UE to save power; and MIMO precoding information. A more detailed discussion of 3GPP standard DCI formats may be found in 3GPP TS 36.212 (Section 5.3.3.1) which is incorporated herein by reference. In a "T-shaped" VC as discussed above, there could be insufficient capacity in the control region to provide the many PDCCHs that may be needed in an MTC scenario. Furthermore, to provide control information specific to the VC, a straightforward solution would be to create a new DCI format. However, this step in isolation would increase the blind decoding load for UEs aware of the new format and, since MTC devices should be low power and low cost, this could be an undesirable approach.

UEs configured to use the VC will typically share a certain amount of common control information relating the operation of the VC. This information is not relevant to all UEs in the cell, so is not suitable for transmission in the common search space (CSS) of PDCCH: nor however need it be transmitted on a multitude of PDCCHs to many UEs in their respective UE-specific search spaces (UESS). The latter approach is deprecated as this is one possible cause of control region overload.

If common VC control information were transmitted in the CSS using such a new DCI format, then it would mean all UEs would be forced to attempt to "blind decode" PDCCHs containing another DCI format; even legacy UEs, for which the format has no meaning and the VC control information, no value. Furthermore, it could be difficult to carry control signalling for multiple independent VCs within an HC all within the CSS.

Figure 1:
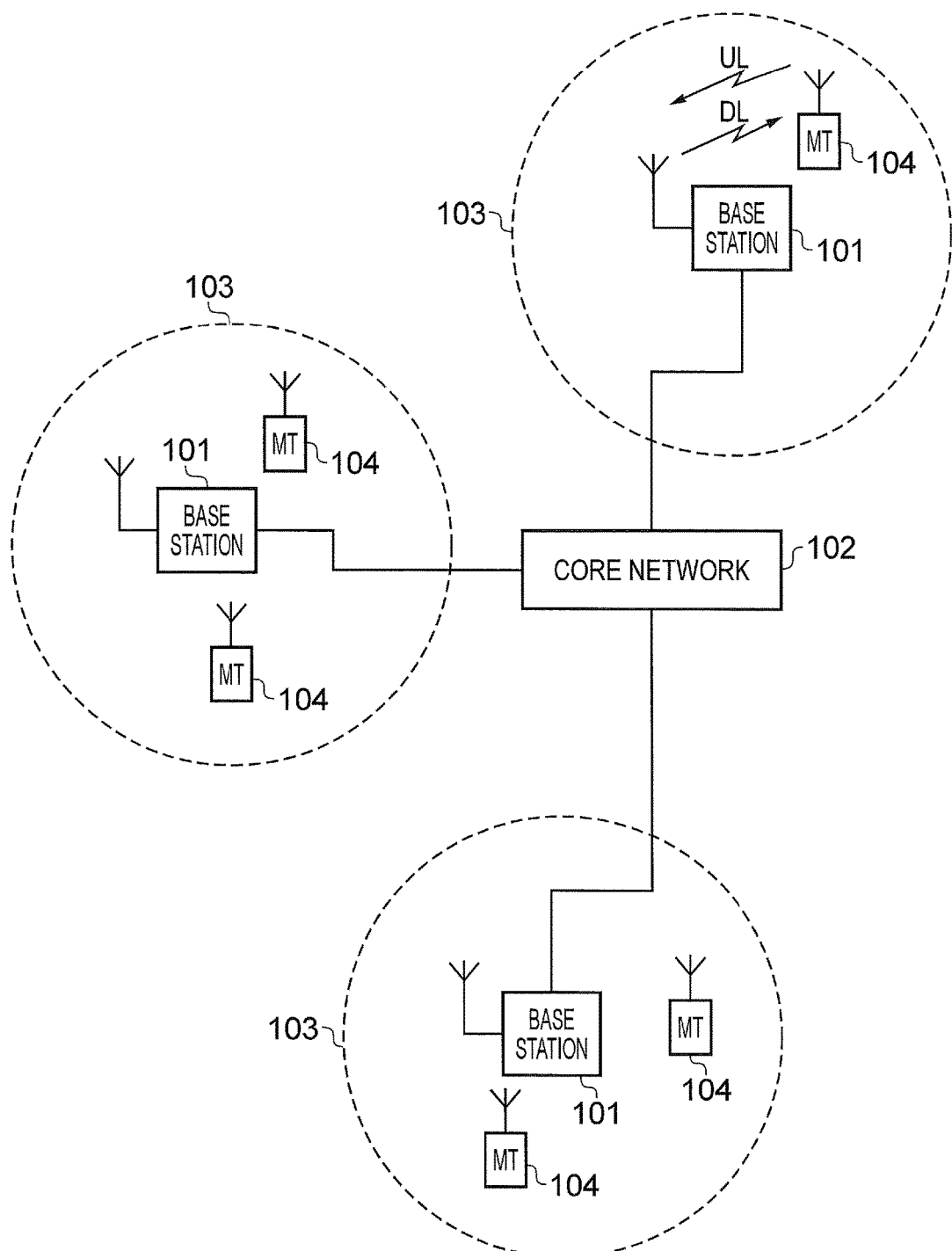
FIG. 1 provides a schematic diagram illustrating an example of a conventional mobile telecommunication network.

Therefore, solutions that mitigate the potential limitations on PDCCH capacity and achieve this with minimal incremental blind-decoding load for UEs are of significant interest. FIG. 1 provides a schematic diagram illustrating some basic functionality of a conventional mobile telecommunications network, using for example a 3GPP defined UMTS and/or Long Term Evolution (LTE) architecture.

The network includes a plurality of base stations 101 connected to a core network 102. Each base station provides a coverage area 103 (i.e. a cell) within which data can be communicated to and from terminal devices (also referred to as mobile terminals, MT or User equipment, UE) 104. Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and the radio uplink (so-called SC-FDMA).

Figure 2:
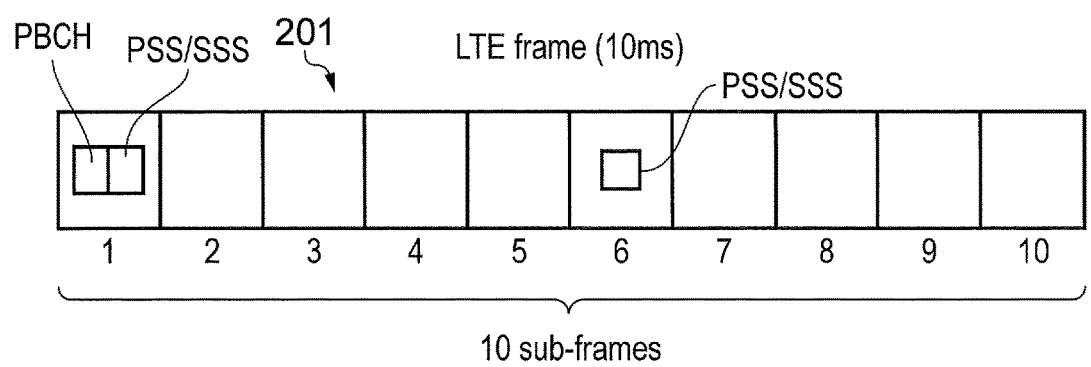
FIG. 2 provides a schematic diagram illustrating a conventional LTE radio frame.

FIG. 2 shows a schematic diagram illustrating an OFDM based LTE downlink radio frame 201. The LTE downlink radio frame is transmitted from an LTE base station (known as an enhanced Node B) and lasts 10 ms. The downlink radio frame comprises ten sub-frames, each sub-frame lasting 1 ms. A primary synchronisation signal (PSS) and a secondary synchronisation signal (SSS) are transmitted in the first and sixth sub-frames of the LTE radio frame, in frequency division duplex (FDD). A physical broadcast channel (PBCH) is transmitted in the first sub-frame of the LTE radio frame. The PSS, SSS and PBCH are discussed in more detail below.

Figure 3:
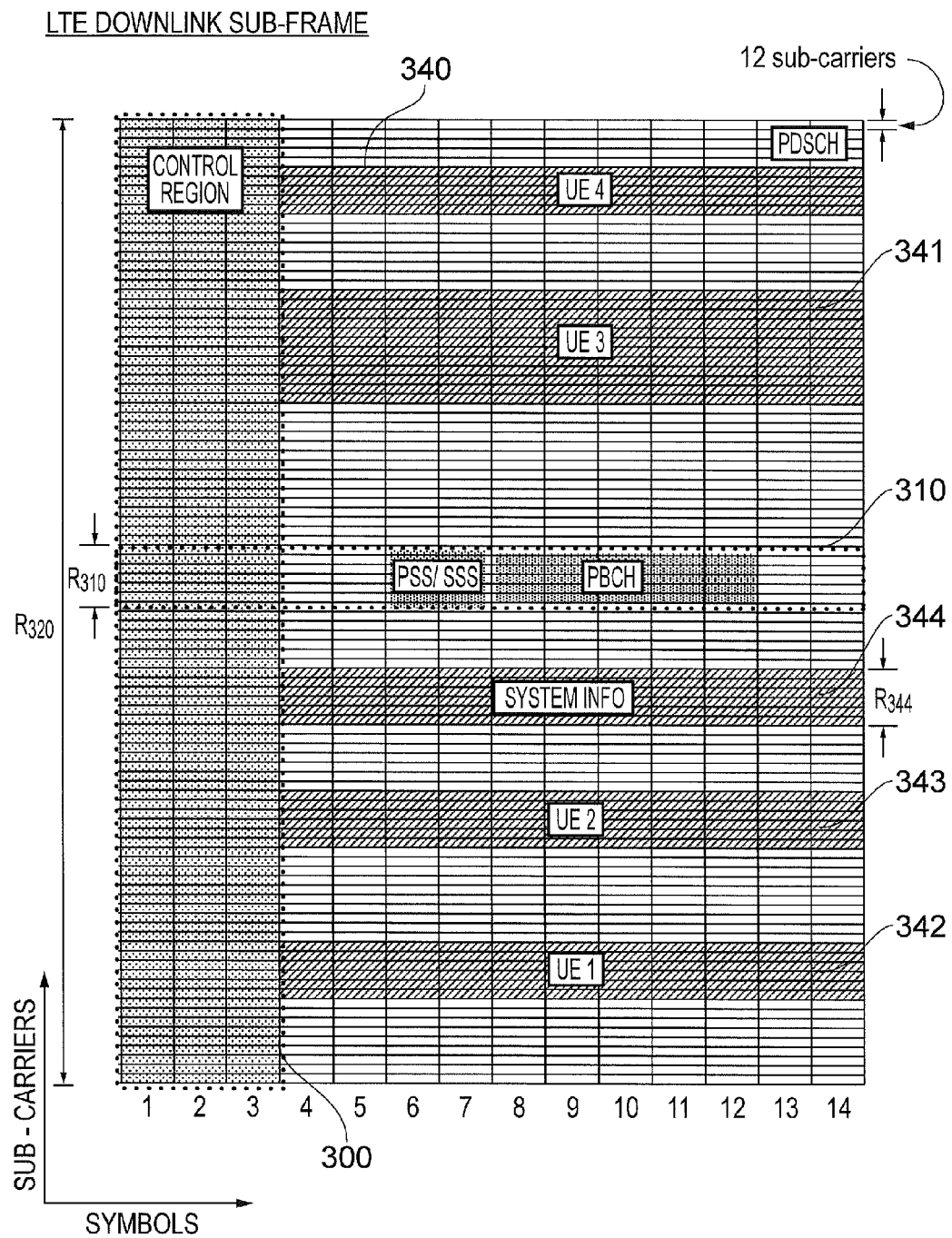
FIG. 3 provides a schematic diagram illustrating an example of a conventional LTE downlink radio sub-frame.

FIG. 3 is a schematic diagram of a grid which illustrates the structure of an example conventional downlink LTE sub-frame. The sub-frame comprises a predetermined number of "symbols", which are each transmitted over a respective $\frac{1}{14}$ ms period. Each symbol comprises a predetermined number of orthogonal sub-carriers distributed across the bandwidth of the downlink radio carrier. Here, the horizontal axis represents time while the vertical represents frequency.

The example sub-frame shown in FIG. 3 comprises 14 symbols and 1200 sub-carriers spread across a 20 MHz bandwidth, $R_{320}$. The smallest allocation of user data for transmission in LTE is a "resource block" comprising twelve sub-carriers transmitted over one slot (0.5 sub-frame). Each individual box in the sub-frame grid in FIG. 3A corresponds to twelve sub-carriers transmitted on one symbol.

FIG. 3 shows in hatching resource allocations for four LTE terminals 340, 341, 342, 343. For example, the resource allocation 342 for a first LTE terminal (UE 1) extends over five blocks of twelve sub-carriers (i.e. 60 sub-carriers), the resource allocation 343 for a second LTE terminal (UE2) extends over six blocks of twelve sub-carriers and so on.

Control channel data is transmitted in a control region 300 (indicated by dotted-shading in FIG. 3) of the sub-frame comprising the first n symbols of the sub-frame where n can vary between one and three symbols for channel bandwidths of 3 MHz or greater and where n can vary between two and four symbols for channel bandwidths of 1.4 MHz. For the sake of providing a concrete example, the following description relates to host carriers with a channel bandwidth of 3 MHz or greater so the maximum value of n will be 3. The data transmitted in the control region 300 includes data transmitted on the physical downlink control channel (PDCCH), the physical control format indicator channel (PCFICH) and the physical HARQ indicator channel (PHICH).

PDCCH contains control data indicating which sub-carriers on which symbols of the sub-frame have been allocated to specific LTE terminals. Thus, the PDCCH data transmitted in the control region 300 of the sub-frame shown in FIG. 3 would indicate that UE1 has been allocated the block of resources identified by reference numeral 342, that UE2 has been allocated the block of resources identified by reference numeral 343, and so on.

PCFICH contains control data indicating the size of the control region (typically between one and three symbols, but four symbols being contemplated to support 1.4 MHz channel bandwidth).

PHICH contains HARQ (Hybrid Automatic Request) data indicating whether or not previously transmitted uplink data has been successfully received by the network.

Symbols in the central band 310 of the time-frequency resource grid are used for the transmission of information including the primary synchronisation signal (PSS), the secondary synchronisation signal (SSS) and the physical broadcast channel (PBCH). This central band 310 is typically 72 sub-carriers wide (corresponding to a transmission bandwidth of 1.08 MHz). The PSS and SSS are synchronisation signals that once detected allow an LTE terminal device to achieve frame synchronisation and determine the cell identity of the enhanced Node B transmitting the downlink signal. The PBCH carries information about the cell, comprising a master information block (MIB) that includes parameters that LTE terminals use to properly access the cell. Data transmitted to individual LTE terminals on the physical downlink shared channel (PDSCH) can be transmitted in other resource elements of the sub-frame. Further explanation of these channels is provided below.

FIG. 3 also shows a region of PDSCH 344 containing system information and extending over a bandwidth of $R_{344}$. A conventional LTE frame will also include reference signals which are discussed further below but not shown in FIG. 3 in the interests of clarity.

The number of sub-carriers in an LTE channel can vary depending on the configuration of the transmission network. Typically this variation is from 72 sub carriers contained within a 1.4 MHz channel bandwidth to 1200 sub-carriers contained within a 20 MHz channel bandwidth (as schematically shown in FIG. 3). As is known in the art, data transmitted on the PDCCH, PCFICH and PHICH is typically distributed on the sub-carriers across the entire bandwidth of the sub-frame to provide for frequency diversity. Therefore a conventional LTE terminal must be able to receive the entire channel bandwidth in order to receive and decode the control region.

As mentioned above, the anticipated widespread deployment of third and fourth generation networks has led to the parallel development of a class of devices and applications which, rather than taking advantage of the high data rates available, instead take advantage of the robust radio interface and increasing ubiquity of the coverage area. This parallel class of devices and applications includes MTC devices and so-called machine to machine (M2M) applications, wherein semi-autonomous or autonomous wireless communication devices typically communicate small amounts of data on a relatively infrequent basis.

Examples of MTC (and M2M) devices include: so-called smart meters which, for example, are located in a customer's house and periodically transmit information back to a central MTC server data relating to the customers consumption of a utility such as gas, water, electricity and so on; "track and trace" applications such as transportation and logistics tracking, road tolling and monitoring systems; remote maintenance and control systems with MTC-enabled sensors, lighting, diagnostics etc.; environment monitoring; point of sales payment systems and vending machines; security systems, etc.

Further information on characteristics of MTC-type devices and further examples of the applications to which MTC devices may be applied can be found, for example, in the corresponding standards, such as ETSI TS 122 368 V10.530 (2011-07)/3GPP TS 22.368 version 10.5.0 Release 10) [1].

Whilst it can be convenient for a terminal such as an MTC type terminal to take advantage of the wide coverage area provided by a third or fourth generation mobile telecommunication network, there are at present disadvantages and challenges to successful deployment. Unlike a conventional third or fourth generation terminal device such as a smartphone, an MTC-type terminal is preferably relatively simple and inexpensive: in addition MTC-devices are often deployed in situations that do not afford easy access for direct maintenance or replacement—reliable and efficient operation can be crucial. Furthermore, while the type of functions performed by the MTC-type terminal (e.g. collecting and reporting back data) do not require particularly complex processing to perform, third and fourth generation mobile telecommunication networks typically employ advanced data modulation techniques (such as 16QAM or 64QAM) on the radio interface which can require more complex and expensive radio transceivers to implement.

It is usually justified to include such complex transceivers in a smartphone as a smartphone will typically require a powerful processor to perform typical smartphone type functions. However, as indicated above, there is now a desire to use relatively inexpensive and less complex devices to communicate using LTE type networks. In parallel with this drive to provide network accessibility to devices having different operational functionality, e.g. reduced bandwidth operation, there is a desire to optimise the use of the available bandwidth in a telecommunications system supporting such devices.

In many scenarios, providing low capability terminals such as those with a conventional high-performance LTE receiver unit capable of receiving and processing (control) data from an LTE downlink frame across the full carrier bandwidth can be overly complex for a device which only needs to communicate small amounts of data. This may therefore limit the practicality of a widespread deployment of low capability MTC type devices in an LTE network. It is preferable instead to provide low capability terminals such as MTC devices with a simpler receiver unit which is more proportionate with the amount of data likely to be transmitted to the terminal.

A "virtual carrier" tailored to low capability terminals such as MTC devices is thus provided within the transmission resources of a conventional OFDM type downlink carrier (i.e. a "host carrier"). Unlike data transmitted on a conventional OFDM type downlink carrier, data transmitted on the virtual carrier can be received and decoded without needing to process the full bandwidth of the downlink host OFDM carrier, for at least some part of a sub-frame. Accordingly, data transmitted on the virtual carrier can be received and decoded using a reduced complexity receiver unit.

The term "virtual carrier" corresponds in essence to a narrowband carrier for MTC-type devices within a host carrier for an OFDM-based radio access technology (such as WiMAX or LTE).

The virtual carrier concept is described in a number of co-pending patent applications (including GB 1101970.0 [2], GB 1101981.7 [3], GB 1101966.8 [4], GB 1101983.3 [5], GB 1101853.8 [6], GB 1101982.5 [7], GB 1101980.9 [8] and GB 1101972.6 [9]), the contents of which are incorporated herein by reference. For ease of reference, however, an overview of certain aspects of the concept of virtual carriers is set out in Annex 1.

FIG. 4 schematically represents an arbitrary downlink subframe according to the established LTE standards as discussed above into which an instance of a virtual carrier 406 has been introduced. The subframe is in essence a simplified version of what is represented in FIG. 3. Thus, the subframe comprises a control region 400 supporting the PCFICH, PHICH and PDCCH channels as discussed above and a PDSCH region 402 for communicating higher-layer data (for example user-plane data and non-physical layer control-plane signalling) to respective terminal devices, as well as system information, again as discussed above. For the sake of giving a concrete example, the frequency bandwidth (BW) of the carrier with which the subframe is associated is taken to be 20 MHz. Also schematically shown in FIG. 4 by black shading is an example PDSCH downlink allocation 404. In accordance with the defined standards, and as discussed above, individual terminal devices derive their specific downlink allocations 404 for a subframe from PDCCH transmitted in the control region 400 of the subframe.

By contrast with the conventional LTE arrangement, where a subset of the available PDSCH resources anywhere across the full PDSCH bandwidth could be allocated to a UE in any given subframe, in the T-shaped arrangement illustrated in FIG. 4, MTC devices maybe allocated PDSCH resources only within a pre-established restricted frequency band 406 corresponding to a virtual carrier.

Accordingly, MTC devices each need only buffer and process a small fraction of the total PDSCH resources contained in the subframe to identify and extract their own data from that subframe.

The pre-established restricted frequency band used to communicate, e.g. on PDSCH in LTE, from a base station to a terminal device, is thus narrower than the overall system frequency band (carrier bandwidth) used for communicating physical-layer control information, e.g. on PDCCH in LTE. As a result, base stations may be configured to allocate downlink resources for the terminal device on PDSCH only within the restricted frequency band. As the terminal device knows in advance that it will only be allocated PDSCH resources within the restricted frequency band, the terminal device does not need to buffer and process any PDSCH resources from outside the pre-determined restricted frequency band.

In this example it is assumed the base station and the MTC device have both pre-established that data is to be communicated from the base station to the MTC device only within the restricted frequency band defined by upper and lower frequencies f1 and f2 (having a bandwidth $\Delta f$). In this example the restricted frequency band encompasses the central part of the overall system (carrier) frequency band BW. For the sake of a concrete example, the restricted frequency band is assumed here to have a bandwidth ($\Delta f$) of 1.4 MHz and to be centred on the overall system bandwidth (i.e. $f1=fc-\Delta f/2$ and $f2=fc+A\Delta/2$, where fc is the central frequency of the system frequency band). There are various mechanisms by which the frequency band can be established/shared between a base station and terminal device and some of these are discussed further below.

FIG. 4 represents in shading the portions of each subframe for which the MTC device is arranged to buffer resource elements ready for processing. The buffered part of each subframe comprises a control region 400 supporting conventional physical-layer control information, such as the PCFICH, PHICH and PDCCH channels as discussed above and a restricted PDSCH region 406. The physical-layer control regions 400 that are buffered are in the same resources as the physical-layer control regions buffered by any conventional UE. However, the PDSCH regions 406 which are buffered by the MTC device are smaller than the PDSCH regions buffered by conventional UEs. This is possible because, as noted above, the MTC devices are allocated PDSCH resources only within a restricted frequency band that occupies a small fraction of the total PDSCH resources contained in the subframe.

Accordingly, the MTC device will in the first instance receive and buffer the entire control region 400 and the entire restricted frequency band 406 in a subframe. The MTC device will then process the control region 400 to decode PDCCH to determine what resources are allocated on PDSCH within the restricted frequency band, and then process the data buffered during PDSCH symbols within the restricted frequency band and extract the relevant higher-layer data therefrom.

In one example LTE-based implementation, each subframe is taken to comprise 14 symbols (timeslots) with PDCCH transmitted on the first three symbols and PDSCH transmitted on the remaining 11 symbols. Furthermore, the wireless telecommunications system is taken in this example to operate over a system frequency band of 20 MHz (100 resource blocks) with a pre-established restricted frequency band of 1.4 MHz (six resource blocks) defined for communicating with the terminal devices supporting virtual carrier operation.

As explained above, in OFDM-based mobile communication systems such as LTE, downlink data is dynamically assigned to be transmitted on different sub-carriers on a sub-frame by sub-frame basis. Accordingly, in every sub-frame, the network signals which sub-carriers on which symbols contain data relevant to which terminals (i.e. downlink allocation signalling).

As can be seen from FIG. 3, in a conventional downlink LTE sub-frame information regarding which symbols contain data relevant to which terminals is transmitted on the PDCCH during the first symbol or symbols of the sub-frame.

The concept of virtual carriers provided on blocks of OFDM subcarriers that are not centred on the host carrier central frequency is known from co-pending patent application number GB 113801.3 [10], which describes an arrangement where there is a plurality of MTC devices and the central frequency of at least some of the virtual carriers is not same as the central frequency of the host carrier.

Figure 5:
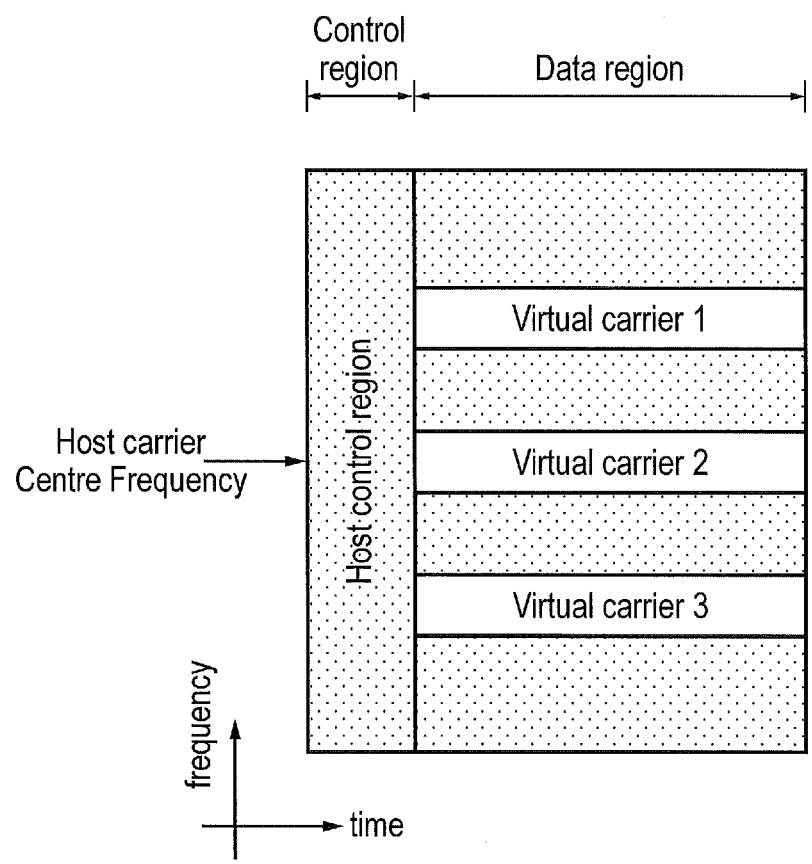
FIG. 5 provides a schematic diagram illustrating an example of a LTE downlink radio sub-frame in which virtual carriers have been inserted at a number of frequencies of the host carrier.

FIG. 5 illustrates this arrangement. A LTE downlink sub-frame is shown with a plurality of virtual carriers outside of the control region 300, the data region includes a group of resource elements positioned below the central band 310 which form a virtual carrier VC3 501. The virtual carrier VC3 501 is adapted so that data transmitted on the virtual carrier VC3 501 can be treated as logically distinct from data transmitted in the remaining parts of the host carrier and can be decoded without decoding all the control data from the control region 300.

FIG. 5 also shows virtual carriers occupying frequency resources above the centre band (VC1, 502) and (as in the situation illustrated in FIG. 4) including the centre band (VC2, 401).

Therefore, depending on, for example, the expected virtual carrier throughput, the location of a virtual carrier can be appropriately chosen to either exist inside or outside the centre band 310 according to whether the host or virtual carrier is chosen to bear the overhead of the PSS, SSS and PBCH. This band allocation method for multiple VCs has particular application when terminals (UEs) using the VC create a significant quantity of traffic at a given time. It is therefore desirable that the respective subsets of UEs served by each virtual carrier can locate control signals relevant to their virtual carrier.

Common and UE Search Spaces for PDCCH

As discussed previously in the context of conventional LTE, at least some of the resource elements (REs) comprising a host carrier (HC) control region are defined by specification to map onto a number of so-called control channel elements (CCEs). FIG. 6C illustrates this mapping process in more detail. The information bits comprising the CCEs are subjected to a process of cell-specific bit scrambling, QPSK modulation, an interleaver operating upon groups of the resulting QPSK symbols, cell-specific shifting of a predetermined number of those QPSK symbols and then the mapping of those symbols to REs (the dark shaded slots in the left hand region of the subframe structure). Physically, any given CCE is distributed across the REs of the HC control region.

The physical downlink control channel (PDCCH) comprises a number of CCEs. The number of CCEs comprising a particular PDCCH depends on the aggregation level determined by the eNodeB. A UE must search through some number of the CCEs in the control region to determine if there are any that comprise PDCCHs containing control information pertinent to the UE.

The locations of CCEs forming PDCCHs can be arranged by the eNodeB to make the search process at the UE more efficient by arranging CCEs for different purposes in logical "search spaces".

Some CCEs are searched (monitored) by all UEs in the cell, these CCEs comprising one or more common search spaces (CSS). The order in which the CCEs of the CSSs within each subframe are searched by UEs remains static and is given by the specification (i.e. not configured by RRC).

Some CCEs are not searched by all UEs, these CCEs comprising a plurality of UE-specific search spaces (UESS). The order in which the CCEs of the UESSs for a given UE within each subframe are searched is dependent upon the relevant RNTI for that UE: the CCEs with which any one UE beings searching a UESS will also change between subframes within a radio frame.

A CCE may be part of more than one search space. Typically, PDCCHs comprising CCEs in a common search space contain information relevant to all UEs in a cell and PDCCHs comprising CCEs in a UE-specific search space contain information relevant only to one UE.

A typical blind decoding process will make around ten attempts to decode common search space. The number of attempts may be restricted as the CSS is limited to only certain DCI formats (i.e. 0, 1A, 3, 3A—see 3GPP TS 36.212)—which carry data relevant to all UEs in the cell. Furthermore the size of the CSS is restricted to a predefined number of resource elements (e.g. 144 REs=2 aggregations of 8-CCEs or 4 aggregations of 4-CCEs).

By contrast, many more blind decoding attempts (~30) are typically required to decode UE-specific search space (UESS) successfully: more possibilities are available to the eNB in terms of the level of aggregation applied to UESS (see the discussion of aggregation levels below) and in terms of DCI formats for data directed to specific UEs.

In what follows, unless otherwise indicated or obvious, references to a UE are references to a UE operating on a VC, i.e. a VC-UE.

Group-Based PDCCH Capability

To address the potential capacity problem in the host carrier control region (i.e. the PDCCH), exemplary embodiments provide the operation of a new group-specific search space (GSS) for PDCCH which conveys control information common to a group of the UEs receiving PDCCH in a given subframe, but which is not common to all such UEs. This group-based control information may be adapted to inform members of a group of VC-UEs where a further control channel can be found which contains information specific to, on the one hand, the structure and operation of the VC and, on the other hand, the usual information conveyed per-UE on PDCCH. More generally this allows information common to a group of UEs, but not intended for broadcast to all UEs, to be signalled efficiently on PDCCH. By defining group search spaces, more efficient use can be made of PDCCH capacity without imposing an unnecessary processing load on non-VC UEs or fundamentally altering the mapping between CCEs and REs (illustrated in FIG. 6C).

Thus a group-based control channel functionality is implemented. This functionality indicates the location of a further control region, which, in turn, indicates to VC-UEs the behaviour of a VC embedded within a HC.

It should be noted that there may in general be more than one VC in operation at a time on an HC (depending on scheduling needs, network configuration, etc.)—as illustrated in FIG. 5. Thus there can be more than one grouped PDCCH in the control region containing information for the more than one VC.

In certain embodiments, the GSS is identified by CRC scrambling with a new group C-RNTI (G-C-RNTI). One mechanism for assigning the new G-C-RNTI to a UE is to have that identifier assigned by the network during the RA procedure.

Assigning Group Identity by Implicit Signalling

Assignment of G-C-RNTIs could be done, for example, by adding an additional field to the Random Access Response (RAR) to convey the G-C-RNTI, which could be taken from among the reserved RNTI values specified in TS 36.321, or by making reservations among the existing C-RNTIs in specification, or by defining new RNTI values. This approach is not backwards compatible, since legacy UEs would not be able to interpret the extended RAR this would produce.

Figure 8A:
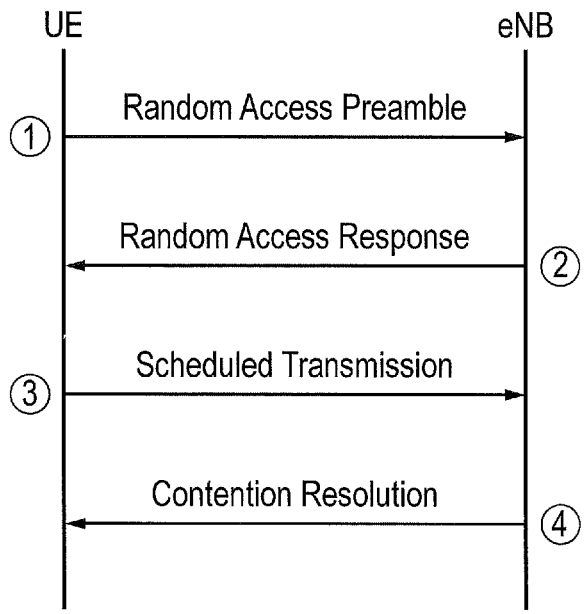
FIG. 8A provides a schematic illustration of contention-based random access procedure in LTE.

The conventional Radio Resource Control (RRC) signalling in the random access procedure is summarised in 3GPP TS 36.300. The overall (contention based) Random Access (RA) procedure is shown in FIG. 8A.

An RA preamble is sent from a UE to a base station (i.e. an eNodeB). The UE uses a RA preamble transmission to announce its presence in a cell and to allow the eNB to establish the time of flight of the signal from UE to base station.

Figure 8B:
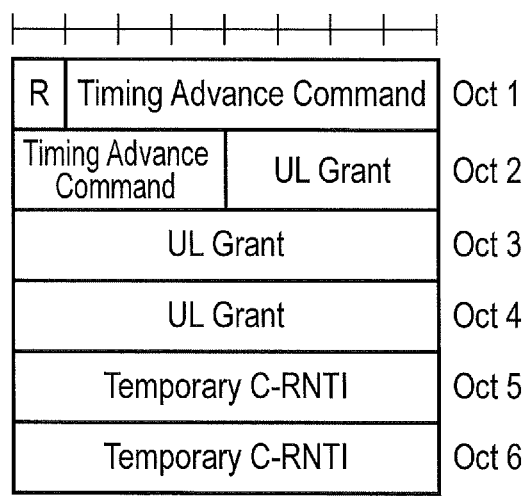
FIG. 8B shows the structure of a conventional MAC RAR message.

The base station constructs a RAR addressed to the RA-RNTI given by the UE. The RA-RNTI is determined by the time and frequency resources in which the UE transmitted the RA preamble. The RAR also includes a temporary C-RNTI (a new identifier assigned to the UE while it is in the cell), and an indication of which preamble was received. The structure of the RAR at the MAC layer is described in 3GPP TS 36.321 and illustrated at FIG. 8B.

Figure 8C:
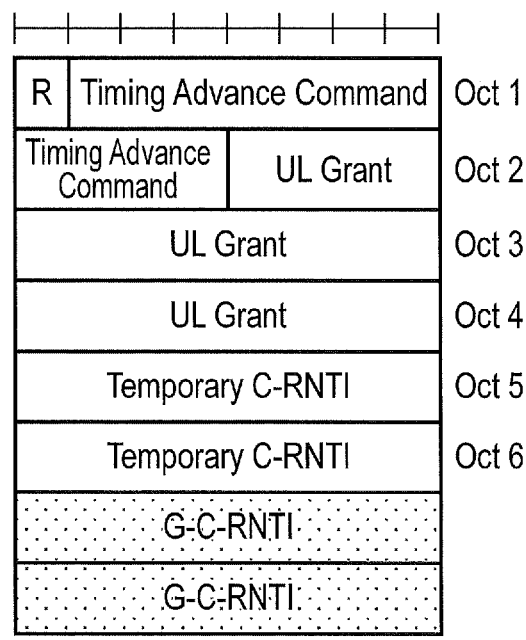
FIG. 8C shows the structure of a MAC RAR message extended to include a G-C-RNTI.

The assignment of a group C-RNTI by extending the conventional RAR is illustrated in FIG. 8C.

A method for assigning a group C-RNTI whilst maintaining the current size and structure of the RAR, is for the network to construct a RAR as follows: the RAR is still addressed to RA-RNTI and contains a temporary C-RNTI (and other information specified in 3GPP TS 36.321), however the indication of which preamble was received can differ from that which was actually received (and assumed to have been transmitted by the UE) as described next.

An RA preamble comprises a sequence. There are N=64 such sequences, also known as "RA preamble sequences" or "preamble signatures" or simply "preambles", defined in a cell. For illustration, consider that these preambles are numbered n=0 . . . 63. Normally, the eNB constructs the RAR containing an indication of the same preamble signature numbered $n_1$ as was actually received from (and assumed to have been transmitted by) the UE for which the RAR is intended. However, in this embodiment, the eNB indicates another preamble numbered $n_2$ in general not equal to $n_1$ such that $$\frac{n_1}{n_2} \mathrm{mod} N_{VC} = g$$

where $N_{VC}$ is the number of virtual carrier groups defined in the cell and g is the group to which the eNB wishes to assign the UE. The mapping from a value of g to a G-C-RNTI may be provided in RRC signalling, specified in a standard, or broadcast.

A UE decoding an RAR addressed to the relevant RA-RNTI therefore obtains a temporary C-RNTI as usual and infers a G-C-RNTI.

As the UE still selects preamble signature $n_1$ at random, there is a non-trivial chance that another UE in the cell may select the same preamble signature—a scenario referred to as "contention". Should there be contention on the choice of preamble, conventional methods can be used to resolve it. FIG. 8A shows additional signalling in the specification of the random access procedure (see 3GPP TS 36.300) specifically dealing with preamble signature contention.

Another backwards compatible method would be to reserve some temporary C-RNTI values from the allowed range, or use the reserved range of RNTIs, and define that a temporary C-RNTI received in the RAR is used as the G-C-RNTI by compatible UEs. Higher-layer signalling, such as an RRC configuration, could indicate whether a compatible UE should actually pay any regard to a G-C-RNTI acquired in this way.

Yet another example, maintaining the current size and structure of the RAR, is for the network to construct the RAR for a grouped UE to contain one of the reserved RNTIs discussed earlier instead of one of the values of RNTI permitted for C-RNTI. Normally, a UE would simply ignore such an RAR. However, a UE operating in accordance with this embodiment interprets an RAR containing a reserved RNTI as signalling that: it can regard its temporary C-RNTI as its permanent C-RNTI; and its G-C-RNTI is the (reserved) RNTI contained in the RAR.

However the G-C-RNTI is assigned and transmitted to the UE, UEs now in possession of a G-C-RNTI are expected to search for PDCCHs in the CSS and GSS at least. Note that in certain cases, there is no need for such UEs to search the UESS on the HC control region for a UE-specific PDCCH since their UE-specific information may be confined to the VC. Nevertheless, depending on system design and configuration, such UEs may additionally search for UE-specific PDCCHs on the HC.

Group-Specific Search Space Operation

PDCCHs in the GSS can use a group DCI (G-DCI). This G-DCI can adopt an existing DCI format, or use one or more new DCI format(s) which are restricted specifically to the GSS; the DCI format used being selected so that the number of blind decodes across DCI formats is limited. Irrespective of format, the G-DCI conveys information relevant to all UEs in the group. Particular examples for the VC include:

The location of a further control region within the resources of the VC.

The reference signal (RS) structure on the VC, since this may differ from that in existing specifications and the HC.

Carrier aggregation (CA) information specific to aggregated VCs.

The PDCCHs within the VC control region then provide UE-specific information regarding the scheduling, etc. on the VC. Note that it is therefore possible that a UE in possession of a G-C-RNTI need not search for a UESS on the HC control region (PDCCH), saving a potentially significant amount of blind decoding processing effort.

Figure 6A:
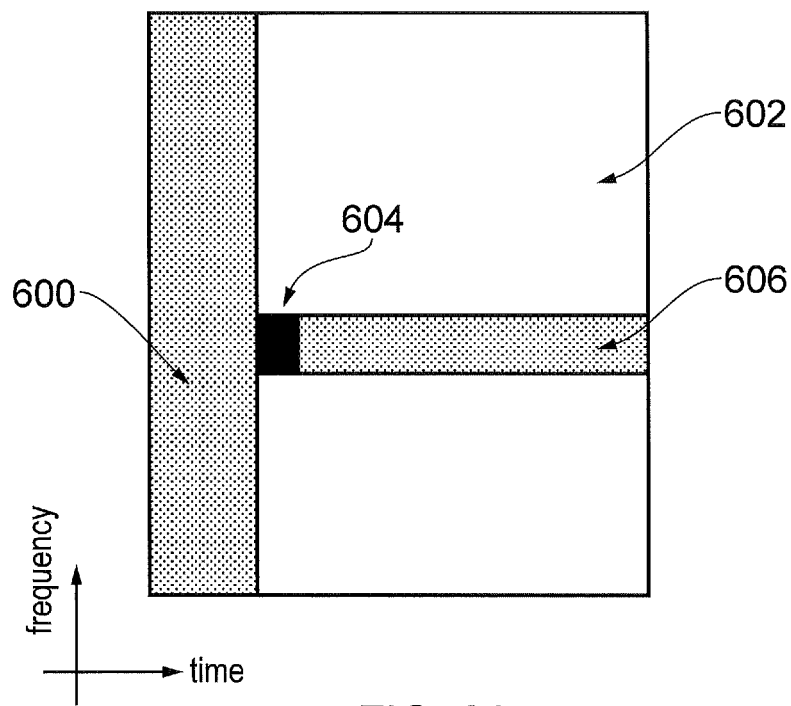
FIG. 6A provides a schematic diagram illustrating an example of a LTE downlink radio sub-frame in which the HC control region is supplemented by a VC control region (a VC PDCCH region) within the restricted frequency band of a virtual carrier.

FIG. 6A shows a LTE downlink radio sub-frame in which a HC control region 600 is supplemented by a VC control region 604 (a VC PDCCH region) within the restricted frequency band of a virtual carrier 606. As in FIG. 4, the regions outside the HC control region 600 and the virtual carrier region 606 constitute a PDSCH region 602 for communicating data (for example user-plane data and non-physical layer control-plane signalling) to conventional LTE terminal devices. In this instance, the VC control region 604 occupies symbols across the entire restricted frequency band of the virtual carrier which immediately succeed the symbols of the HC control region 600. The VC control region is not however limited to occupying these particular symbols or indeed to having an extent across the available virtual carrier frequency bands.

Certain REs of the HC control region 600 constitute the CSS and GSS for a VC UE (RE occupation of the search spaces is not shown in detail, and is defined by specification—search spaces are not in contiguous REs in general). A UE searches CSS and GSS, with GSS containing a PDCCH carrying a DCI indicating the location of the VC control region as well as other information which is VC-specific for all UEs using the illustrated VC.

Recent developments of the LTE standard have lead to a proposal for the introduction of a narrow band control channel, Enhanced Physical Downlink Control Channel (EPDCCH), supplemental to the PDCCH. The EPDCCH is transmitted over a number of contiguous subcarriers or a number of sets of contiguous subcarriers, the number of subcarriers in any one set and the total number of subcarriers in all the sets being fewer than the number of subcarriers available in a subframe (thus "narrow band" relative to the full bandwidth of the host carrier). By analogy, a virtual carrier may itself implement a narrow band control channel (VC EPDCCH) that extends in a subset of the VC subcarriers over a substantial part of the subframe.

If the network provides a suitable VC, the VC could include its own EPDCCH regions as well as PDCCH regions within the resources of the VC. In this case, the GSS on the conventional (wideband) PDCCH can provide additional control information to the group of UEs regarding how to access the VC-EPDCCH. EPDCCH on the HC could be inaccessible since the UE is by assumption narrowband at least outside the HC control region.

Figure 6B:
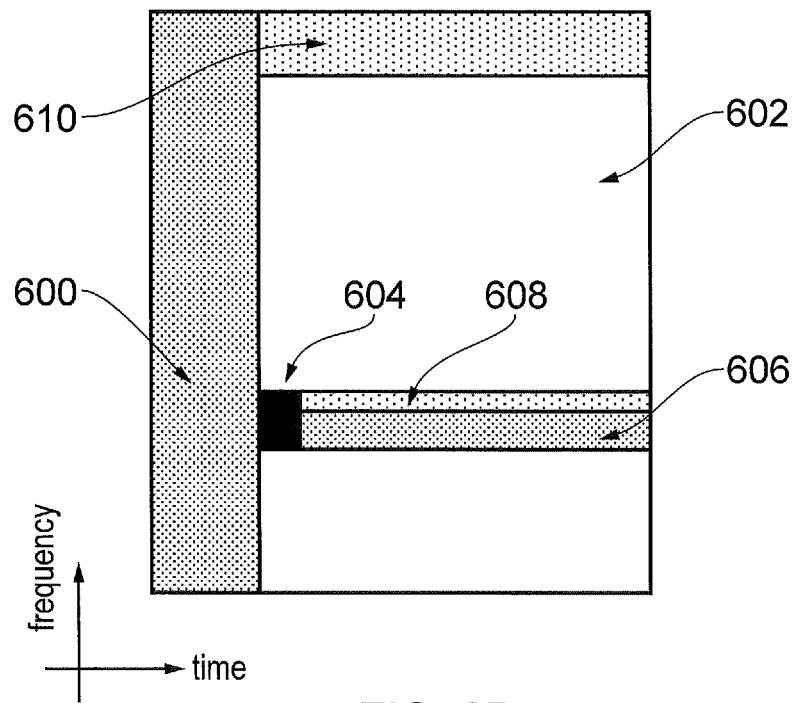
FIG. 6B provides a schematic diagram illustrating an example of a LTE downlink radio sub-frame in which the HC control region is supplemented by a VC control region (a VC PDCCH region) and a VC-EPDCCH within the restricted frequency band of a virtual carrier and an EPDCCH control region.
Figure 6C:
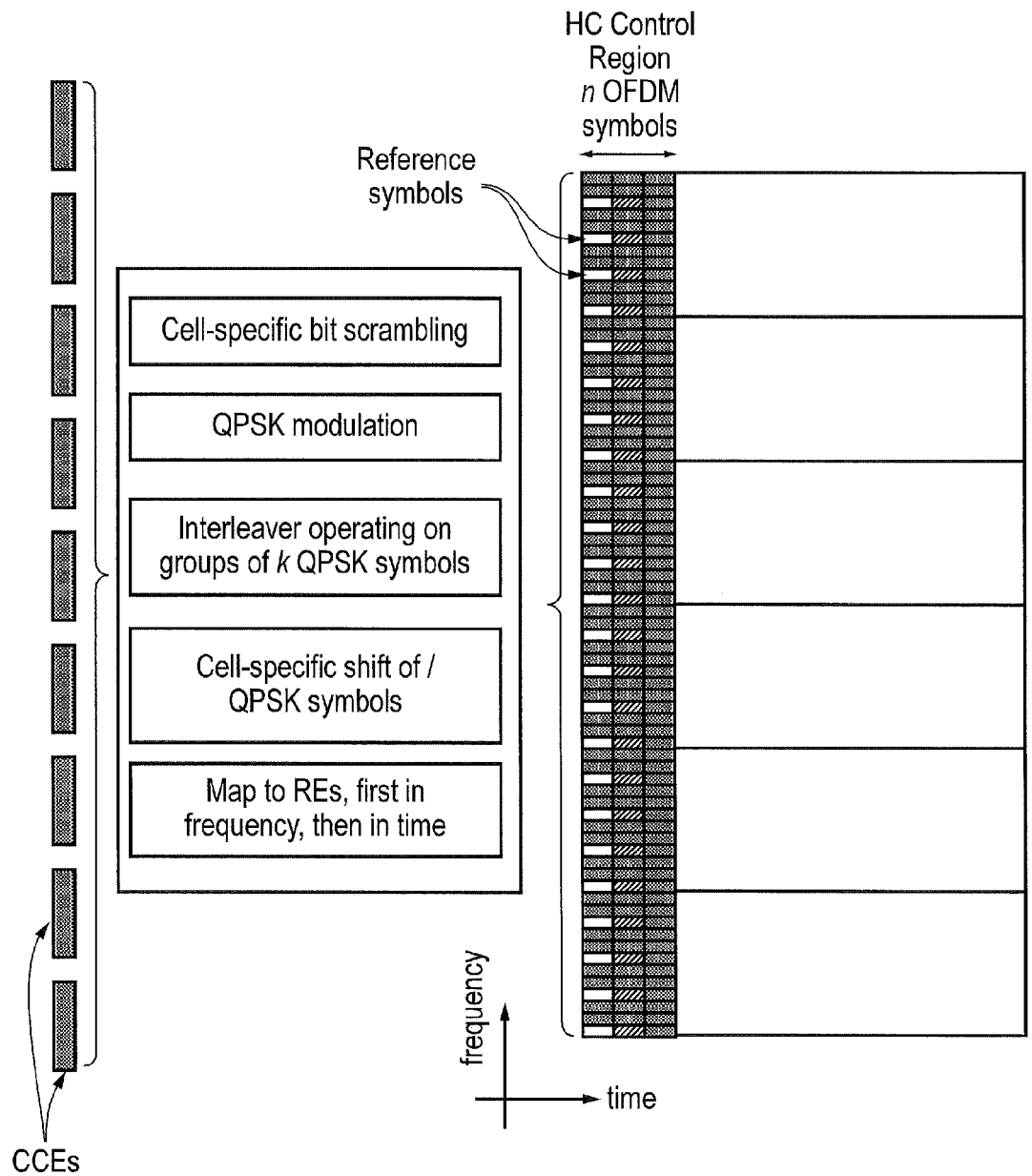
FIG. 6C provides a schematic diagram illustrating the relationship between CCEs and REs within the HC control region.

FIG. 6B illustrates an example of a LTE downlink radio sub-frame in which the HC control region 600 is supplemented by a VC control region 604 (a VC PDCCH region) and a VC-EPDCCH region 608 within the restricted frequency band of a virtual carrier 606, together with an EPDCCH control region 610. The regions outside the HC control region 600, the virtual carrier region 606 and the EPDCCH control region 610 constitute a PDSCH region 602 for communicating data (for example user-plane data and non-physical layer control-plane signalling) to conventional LTE terminal devices. As in FIG. 6A, the VC control region 604 occupies symbols across the entire restricted frequency band of the virtual carrier which immediately succeed the symbols of the HC control region 600. The VC-EPDCCH region 608 occupies a region of the subframe, within the restricted frequency band of a virtual carrier 606, which extends across symbols in a subset of the virtual carrier subcarriers which are distinct from the symbols of the HC and VC control regions. The EPDCCH control region 610 occupies symbols in a different subset of subcarriers distinct from the symbols of the HC control region 600.

As for FIG. 6A, certain REs of the HC control region 600 constitute the CSS and GSS for a VC UE. A UE decodes CSS and GSS, with GSS containing a group-specific indication of the location of the 'legacy' VC control region 604 (corresponding to the PDCCH) and the VC EPDCCH 608, along with other VC-specific information.

In conventional solutions, access to VC-EPDCCH 608 could require further signalling on the legacy control region 604 (VC-PDCCH). However, given the restricted bandwidth and desire to minimise the overhead in these restricted resources, having to signal to VC-UEs the location of VC EPDCCH 608 from within the VC could be overhead-heavy. Instead, in certain embodiments, the GSS on the HC's PDCCH 600 can be used to provide all relevant UEs with direct access to the VC-EPDCCH 608 (as well as VC-PDCCH 604, if desired), freeing up resource on the VC and in its control region.

Location of GSS

As noted above, the location (start point) of each UE's UESS among the various CCEs can change per subframe to reduce the possibility of scheduling conflicts making it impossible to schedule all desired UEs for successive subframes. The CSS on the other hand is fixed in location to reduce the search load for UEs. Since there could be more than one group-based PDCCH, at least one per VC, the same location (start point) nature for the GSS could be appropriate as for the UESS, i.e. that location should ideally change on a per subframe basis. The location (start point) of the GSS could be determined based on the G-C-RNTI assigned to the group, in a similar manner to the start point of searching UESS being defined by the conventional C-RNTI assigned to a UE.

Power Control in PDCCH

There is no support for power control for PDCCH. Instead of power control, SINR adjustment based on the number of Control Channel Elements (CCE) is applied. A CCE corresponds to nine resource element (RE) groups (also known as "quadruplets"). A physical control channel (i.e. PDCCH) is transmitted on one CCE or an aggregation of several consecutive CCEs: the LTE standard has "aggregations" of one, two, four and eight CCEs. The number of CCEs in an aggregation is referred to as the "aggregation level". While power is not directly controlled, the aggregation of CCEs can increase the total power expended transmitting the PDCCH, thereby increasing the effective range from the physical location of an eNB within which it may be received by UEs.

FIG. 6C illustrates the correspondence between CCEs and resource element (RE) groups. In general, the CCEs map to REs that are distributed across the n OFDM symbols of the HC control region. Aggregating more CCEs to transmit a PDCCH means that a greater proportion of the REs in the HC control region are devoted to that PDCCH.

As noted previously, in terms of blind decoding, the permitted aggregation level is one parameter that can be used to restrict the number of attempts at decoding the PDCCH data.

Determining Aggregation Level of GSS

The aggregation level appropriate to transmission of a PDCCH may typically be determined by the size of the DCI it carries and the total power with which the UE needs to receive it, according to e.g. radio channel conditions. To reduce blind search load, the PDCCHs in the CSS are transmitted at an aggregation level only of 4 or 8, while the UESS uses aggregation levels of 1, 2, 4 or 8. The PDCCHs in the GSS, since they could apply to a UE at any distance from the eNB, anywhere in the cell, may be best suited to using aggregation levels 4 or 8, like the CSS.

Since a UE must already search two search spaces, it is desirable to reduce the processing load from the introduction of the GSS. Some methods for implementing the GSS are now described which achieve this aim.

In a first case, the aggregation level of PDCCHs in the GSS could be transmitted on PBCH (the physical broadcast channel—in the first subframe of each radio frame) by using some of the unused bits of the master information block (MIB). This allows updates to the aggregation level once per radio frame when a new MIB can be transmitted.

In a second case, the aggregation level of the PDCCHs in the GSS is linked to that of the CSS. As each PDCCH found in the CSS could be at aggregation level 4 or 8 independently, the linkage may be to an aggregation level determined from one or more of those of the PDCCH found in the CSS. For example, the aggregation level of PDCCHs in the GSS could be defined in specifications to be the same as that of the highest aggregation level used on CSS or some other fixed function of that of the PDCCHs in the CSS, leaving the eNB free to set the aggregation of PDCCHs in the CSS. Further, the UE may be expected to decode the PDCCHs from the CSS before attempting the GSS. Thus, for example if a CSS aggregation level is 8, the GSS could have aggregation level 4 or it could simply be 8, as for the CSS.

In a third case, the aggregation level of PDCCHs in the GSS is a predetermined function of the G-C-RNTI. However, this means that the aggregation level used by a UE can only change when its G-C-RNTI changes, which may be only slowly when the group it identifies is disbanded, for example.

In a fourth case, the aggregation level to be used in transmission may be determined by the eNodeB, that determination being dependent on feedback, or lack of expected feedback, from UE/UEs. It is noted that UEs successfully decoding the grouped PDCCH in a GSS are expected then to decode at least VC-PDCCH and VC-PDSCH if appropriate. At least one among the UEs in a group will then be expected to eventually send feedback, i.e. as HARQ ACK/NACKs on PUCCH or PUSCH. However, if the GSS is not successfully searched or decoding of the group PDCCH fails at some UEs, some UEs will send neither ACK nor NACK and so the rate of receiving ACK/NACKs on PUCCH or PUSCH will be lower than expected. This would imply that the aggregation level of the grouped PDCCH may not be high enough to ensure good decoding success probability and the eNB could then increase the aggregation level as appropriate, e.g. from 4 to 8. If the rate of ACK/NACK reception is at an expected level, the eNB could try reducing the aggregation level of the group PDCCH, e.g. from 8 to 4, until the rate of ACK/NACK reception falls below a suitable level.

Of course, the last technique may be used in conjunction with any one of the previous cases: an initial or default aggregation level being set by one of the first three schemes and then dynamically updated depending upon decoding success probability.

As seen in the preceding sections, the GSS would preferably be implemented with a mixture of the characteristics of the CSS (aggregation level) and UESS (location) reflecting its distinctive purpose.

As noted above, there is the possibility that a UE will fail to successfully decode its group-based PDCCH, or incorrectly decode a grouped PDCCH not intended for it. In these cases, that UE will be unable to access the remainder of the subframe. However, this behaviour is the same as that in the case of failure on CSS or UESS. Notably, because each UE is responsible only for decoding its own grouped PDCCH, a failure of one UE does not necessarily imply failure of another UE.

As noted above embodiments of the invention may in particular be employed within the context of what might be termed "virtual carriers" operating within a bandwidth of one or more "host carriers". The concepts of virtual carriers are described in Annex 1.

Figure 9:
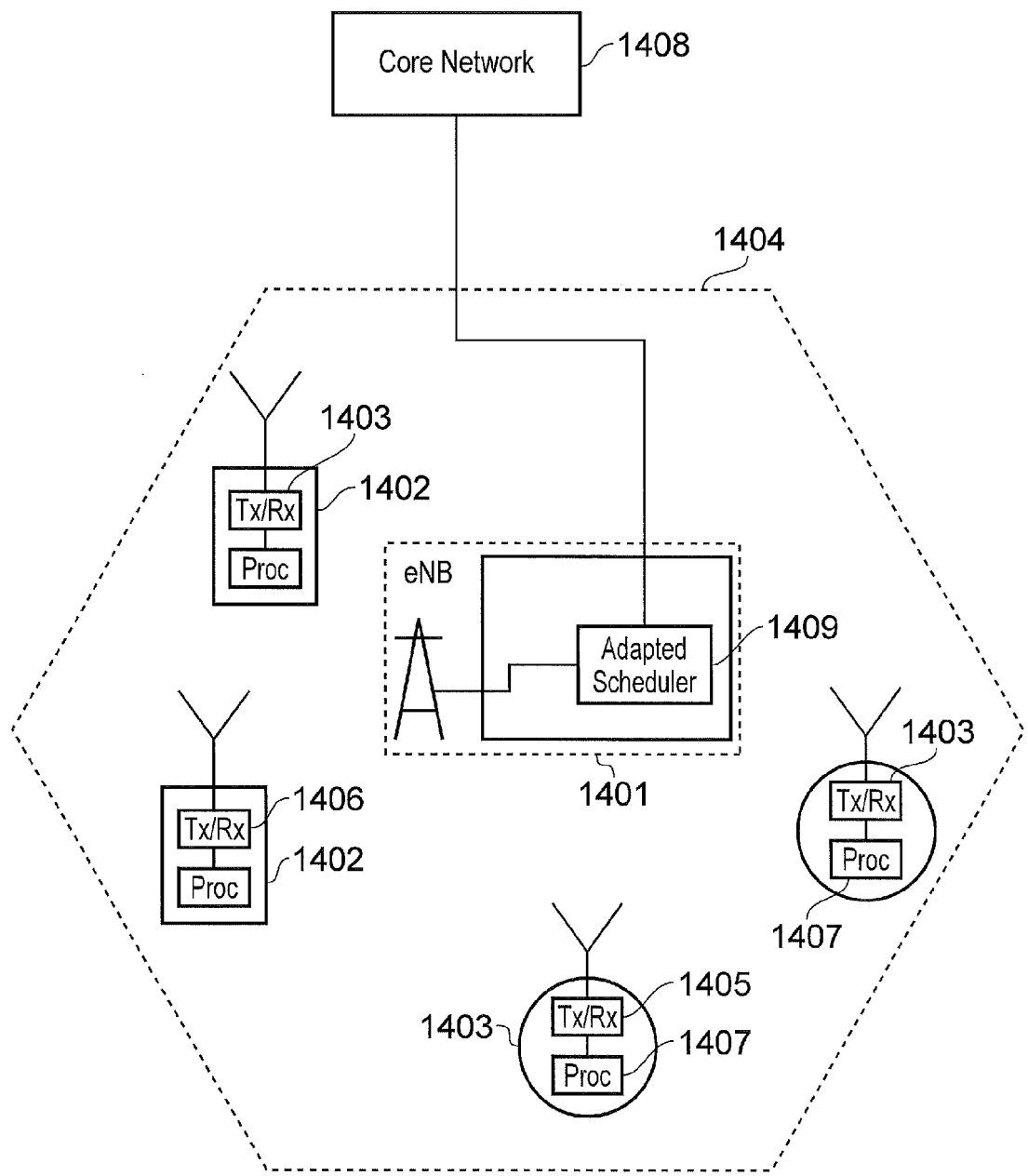
FIG. 9 provides a schematic diagram illustrating a part of an LTE cellular telecommunications network adapted to provide radio access to conventional LTE terminal and reduced capacity terminals in accordance with an embodiment of the present invention.

FIG. 9 provides a schematic diagram showing part of an adapted LTE mobile telecommunication system arranged in accordance with an embodiment of the present invention. The system includes an adapted enhanced Node B (eNB) 1401 connected to a core network 1408 which communicates data to a plurality of conventional LTE terminals 1402 and reduced capability terminals 1403 within a coverage area (cell) 1404. Each of the reduced capability terminals 1403 has a transceiver unit 1405 which includes a receiver unit capable of receiving data across a reduced bandwidth (i.e. narrowband) and a transmitter unit capable of transmitting data across a reduced bandwidth when compared with the capabilities of the transceiver units 1406 included in the conventional LTE terminals 1402.

The adapted eNB 1401 is arranged to transmit downlink data using a sub-frame structure that includes a virtual carrier as described with reference to FIG. 11. The task of assigning reduced capacity terminals 1403 to a given virtual carrier is performed by a radio resource management (RRM) unit 1411 within the eNB 1401. Data is then transmitted to reduced capability terminals 1403 by an adapted scheduling unit 1409 in the eNB. The reduced capability terminals 1403 are thus able to receive and transmit data using the downlink virtual carriers as described above.

As has been explained above, because the reduced complexity terminals 1403 receive and transmit data across a reduced bandwidth on the uplink and downlink virtual carriers, the complexity, power consumption and cost of the transceiver unit 1405 needed to receive and decode downlink data and to encode and transmit uplink data is reduced compared to the transceiver unit 1406 provided in the conventional LTE terminals.

When receiving downlink data from the core network 1408 to be transmitted to one of the terminals within the cell 1404, the adapted eNB 1401 is arranged to queue that data in a queue 1410 and to determine if the data is bound for a conventional LTE terminal 1402 or a reduced capability terminal 1403. This can be achieved using any suitable technique. For example, data bound for a reduced capability terminal 1403 may include a virtual carrier flag indicating that the data must be transmitted on the downlink virtual carrier. If the adapted eNB 1401 detects that downlink data is to be transmitted to a reduced capability terminal 1403, an adapted scheduling unit 1409 included in the adapted eNB 1401 ensures that the downlink data is transmitted to the reduced capability terminal in question on the downlink virtual carrier. In another example the network is arranged so that the virtual carrier is logically independent of the eNB. More particularly the virtual carrier may be arranged to appear to the core network as a distinct cell so that it is not known to the core network that the virtual carrier has any relationship with the host carrier. Packets are simply routed to/from the virtual carrier just as they would be for a conventional cell.

In another example, packet inspection is performed at a suitable point within the network to route traffic to or from the appropriate carrier (i.e. the host carrier or the virtual carrier).

In yet another example, data from the core network to the eNB is communicated on a specific logical connection for a specific terminal device. The eNB is provided with information indicating which logical connection is associated with which terminal device. Information is also provided at the eNB indicating which terminal devices are virtual carrier terminals and which are conventional LTE terminals. This information could be derived from the fact that a virtual carrier terminal would initially have connected using virtual carrier resources.

Virtual carrier terminals are arranged to indicate their capability to the eNB during the connection procedure. Accordingly the eNB can map data from the core network to a specific terminal device based on whether the terminal device is a virtual carrier terminal or an LTE terminal.

In some examples, the virtual carrier inserted within the host carrier can be used to provide a logically distinct "network within a network". In other words data being transmitted via the virtual carrier can be treated as logically and physically distinct from the data transmitted by the host carrier network. The virtual carrier can therefore be used to implement a so-called dedicated messaging network (DMN) which is "laid over" a conventional network and used to communicate messaging data to DMN devices (i.e. virtual carrier terminals).

It will be appreciated that various modifications can be made to the embodiments described above without departing from the scope of the present invention as defined in the appended claims. In particular although embodiments of the invention have been described with reference to an LTE mobile radio network, it will be appreciated that the present invention can be applied to other forms of network such as GSM, 3G/UMTS, CDMA2000, etc. The term MTC terminal as used herein can be replaced with user equipment (UE), mobile communications device, terminal device etc. Furthermore, the term base station refers to any wireless network entity that provides UEs with an air interface to a cellular telecommunications network: while the term has been used interchangeably with e-NodeB in the foregoing it should be understood that it encompasses equivalent network entities in LTE and alternative radio access architectures including: eNode-Bs; Node-Bs, pico-, femto- and micro base station equipment, relays; boosters etc.

The implementations of the invention described herein may require alterations in the operation of the UEs themselves. A key difference in UE behaviour compared to conventional operation is that the UE first searches the CSS on PDCCH and then must search at least the GSS before being able to decode a further control region embedded in a virtual carrier within a host carrier, only after which can it proceed to access UE-specific information regarding, among other things, the resources for DL/UL transmission in the rest of the subframe.

Figure 10:
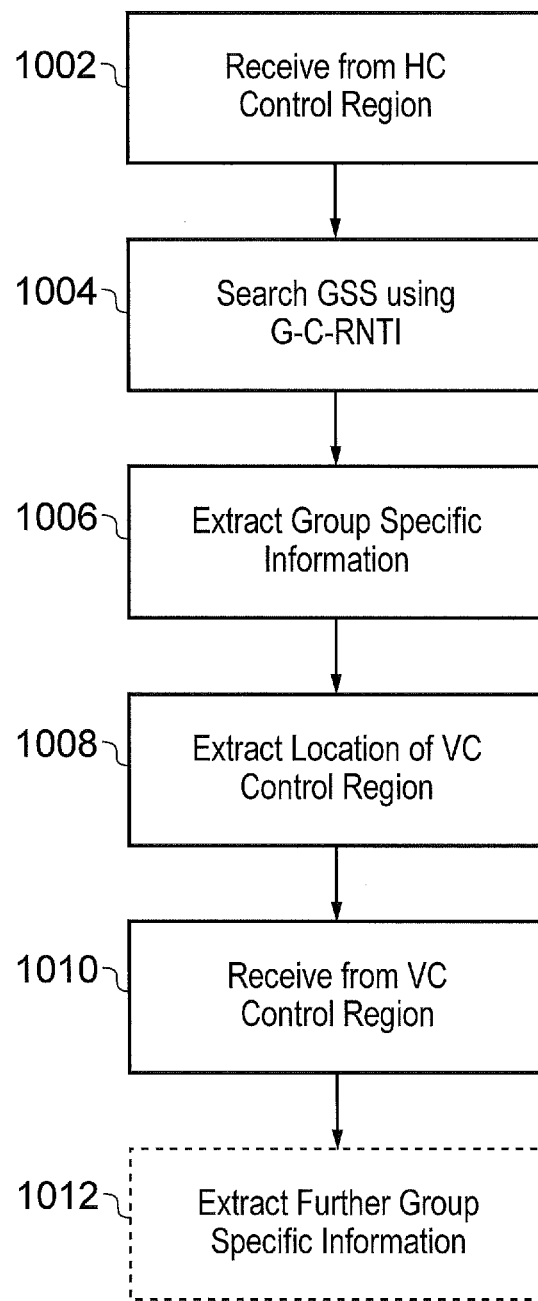
FIG. 10 illustrates the operation of a mobile terminal in accordance with an embodiment of the invention.

FIG. 10 illustrates these steps. In step 1002, data is received from the PDCCH in the HC control region. The GSS is located (step 1004) within the HC control region using a shared group identifier. The GSS PDCCH is processed to extract group-specific information (step 1006) and to obtain information indicative of the location of the further control region (a VC control region, say) (step 1008). Using the location of the further control region, data is received from the further control region (step 1010) and further group-specific information may optionally also be extracted (step 1012; shown in dashed lines). Any CSS on the VC-PDCCH is effectively group-specific information as it is extracted by virtue of access to a control region specific to the group.

In conventional systems, the HC control region is searched for common and UE-specific information, and then the UE can proceed as normal in the remainder of the subframe.

A further difference lies in the UE and network behaviour for obtaining the G-C-RNTI. In at least one backwards compatible embodiment, the UE may be required to determine whether its temporary C-RNTI has been confirmed indirectly by reference to another RNTI provided in the RAR, whereas the C-RNTI is provided directly without a further step in conventional operation.

A further difference relates to obtaining the G-C-RNTI. The G-C-RNTI in the backwards compatible example is confirmed indirectly as a function of another RNTI value rather than by being provided directly.

As discussed above, in certain embodiments, a new compact downlink control information (DCI) format is specified, this new DCI format is used only in the GSS, relieving relevant UEs of a significant degree of blind decoding.

It is further noted that using the GSS to indicate the location of the VC-PDCCH could remove the need for a PCFICH-like functionality to be implemented on the VC (i.e. a separate channel for indicating the size of the VC control region may be unnecessary), saving valuable resource.

By establishing a GSS in the manner described above, the PDCCH can now provide control indication to a subset of all UEs, i.e. control information may now be "multicast" to a limited number of UEs rather than broadcast or UE-specific.

There is no provision in current specifications for an RNTI to be shared among a subset of all UEs: RNTIs other than C-RNTI are cell-specific.

Figure 7:
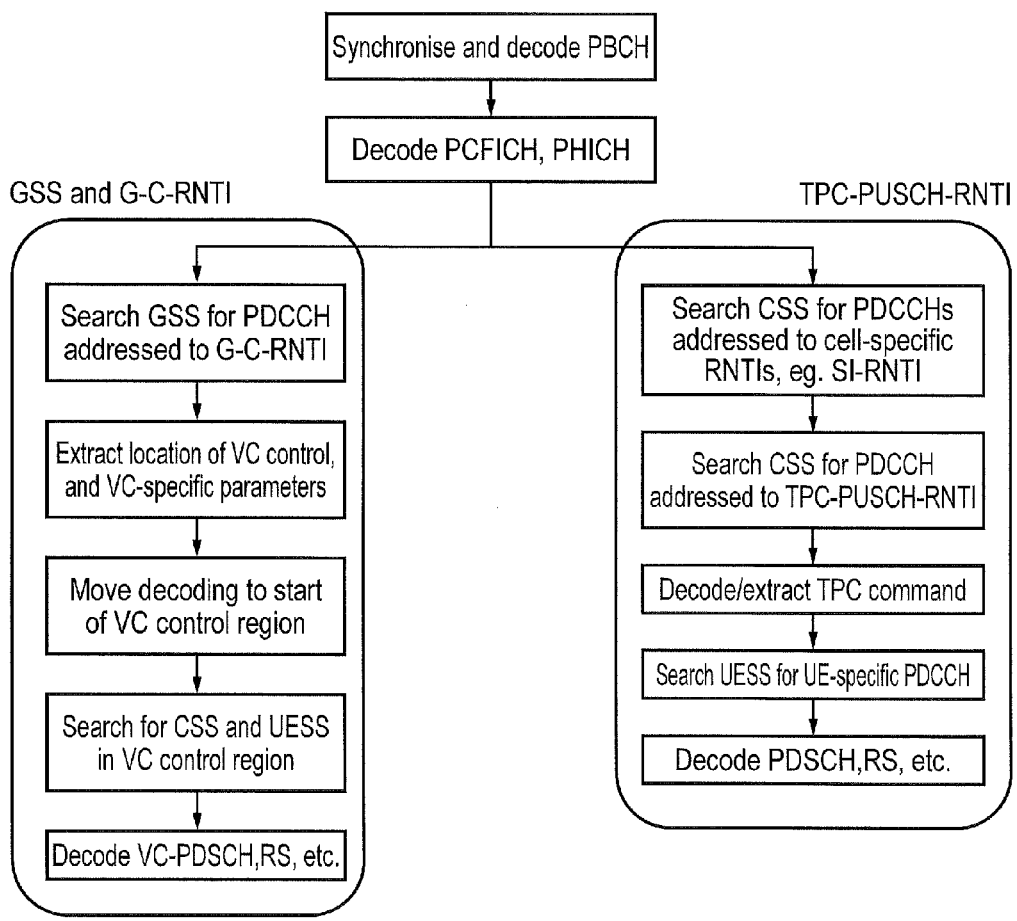
FIG. 7 provides a schematic illustration of schemes for accessing control channel elements within the GSS and CSS.

TPC-PUCCH-RNTI and TPC-PUSCH-RNTI are group-based UE identifiers for PDCCHs. They are identifiers specific to power control procedures and signalled in certain DCI formats on the CSS. They are not however associated with a search space in their own right, being relevant only to the CSS, and only part of the message carried by the power control command is relevant to a particular UE, identified by RRC in the TPC-PDCCH-Config IE. The differences are illustrated in FIG. 7.

PDCCH does not at present include information regarding the structure of a VC, nor the elements of the construction of a carrier identified in the description above.

Annex 1

The virtual carrier concept is described in a number of co-pending UK patent applications (including GB 1101970.0 [2], GB 1101981.7 [3], GB 1101966.8 [4], GB 1101983.3 [5], GB 1101853.8 [6], GB 1101982.5 [7], GB 1101980.9 [8] and GB 1101972.6 [9]). Certain aspects of the concept of virtual carriers are set out below. In this section, the following abbreviations are frequently adopted: virtual carrier—VC, host carrier—HC, user equipment—UE, resource block—RB, radio frequency—RF, and baseband—BB.

Like conventional OFDM, the virtual carrier concept has a plurality of subcarriers disposed at predetermined offsets from a central frequency: the central frequency thus characterises the entire virtual carrier.

Typical virtual carrier bandwidth is six resource blocks, (i.e. 72 sub-carriers) which is in line with minimum 3GPP bandwidth in LTE. However, as will be seen in the following description, the bandwidth of VC is by no means restricted to 6RBs.

In line with Release 8 of the 3GPP standard for LTE (REL8 LTE), VC resources are typically located in the resource blocks centred on the host carrier centre frequency and symmetrically allocated (at either side of that HC centre frequency) regardless of system bandwidth.

FIG. 4 is a schematic diagram of a grid which illustrates the structure of a downlink LTE sub-frame with a virtual carrier 406 occupying the resource blocks centred on the host carrier centre frequency. The virtual carrier central frequency, (f2+f1)/2, is selected to be the central frequency, fc, of the host carrier.

In keeping with a conventional LTE downlink sub-frame illustrated in FIG. 3, the first n symbols form the control region 400 which is reserved for the transmission of downlink control data such as data transmitted on the PDCCH, PCFICH or PHICH.

The signals on the virtual carrier 406 are arranged such that signals transmitted by the host carrier that a terminal device operating on the host carrier would require for correct operation and expect to find in a known pre-determined location (e.g. the PSS, SSS, and PBCH in the central band 310 in FIG. 3) are maintained.

Before a conventional LTE terminal can begin transmitting and receiving data in a cell, it first camps on to the cell. Similarly, an adapted camp-on process can be provided for terminals using the virtual carrier. A suitable camp-on process for virtual carriers is described in detail in GB 1113801.3 [10]: this camp-on process is incorporated herein by reference.

As described in GB 1113801.3 [10], both "conventional LTE" and virtual carrier implementations could conveniently include location information for the virtual carrier within the PBCH, which already carries the Master Information Block (MIB) in the host carrier centre band. Alternatively, virtual carrier location information could be provided in the centre band, but outside of the PBCH. It can for example be always provided after and adjacent to the PBCH. By providing the location information in the centre band but outside of the PBCH, the conventional PBCH is not modified for the purpose of using virtual carriers, but a virtual carrier terminal can easily find the location information in order to detect the virtual carrier, if any.

In the T-shaped operation of FIG. 4, the virtual carrier location information, if provided, can be provided elsewhere in the host carrier. In other implementations of virtual carriers it may be advantageous to provide this information in the centre band, for example because a virtual carrier terminal may configure its receiver to operate in a narrow band about the centre band and the virtual carrier terminal then does not need to adjust its receiver settings for finding the location information.

Depending on the amount of virtual carrier location information provided, the virtual carrier terminal can either adjust its receiver to receive the virtual carrier transmissions, or it may require further location information before it can do so.

If for example, the virtual carrier terminal was provided with location information indicating a virtual carrier presence and/or a virtual carrier bandwidth but not indicating any details as to the exact virtual carrier frequency range, or if the virtual carrier terminal was not provided with any location information, the virtual carrier terminal could then scan the host carrier for a virtual carrier (e.g. performing a so-called blind search process). This process too is discussed in detail in GB 1113801.3 [10].

The reader will readily appreciate that multiple instances of virtual channels may be implemented at different frequency ranges within the same cell. FIG. 5 shows a schematic diagram of a downlink LTE subframe exhibiting three different virtual channels.

The present application claims the Paris convention priority of GB1221729.5 and GB1221717.0 the contents of which are incorporated herein by reference.

The following numbered clauses provide further example aspects and features of the present technique:

1. A wireless communications system for transmitting data to and/or receiving data from mobile terminals, the wireless communications system comprising:
one or more base stations, each of which includes a transmitter and a receiver configured to provide a wireless access interface for communicating data to and/or from the mobile terminals, the wireless access interface providing a plurality of communications resource elements across a first frequency range,
wherein the wireless access interface provided by the one or more base stations includes a plurality of time divided sub-frames, and at least one of the sub-frames includes:
a first control region in a first part of the sub-frame for communicating first signalling information to one or more of the mobile terminals, the first control region including a plurality of control channel resource elements, a first subset of said control channel resource elements providing a group control channel, the group control channel being associated with a group identifier and at least partially encoded using the group identifier; and
a second control region in a second part of the sub-frame, distinct from the first part of the sub-frame, the second control region being for communicating second signalling information to a predetermined group of the mobile terminals,
and wherein the group control channel contains information indicative of the location of the second control region, said information being accessible by applying the group identifier to the group control channel and each of the predetermined group of mobile terminals using the same group identifier.

2. A wireless communications system according to clause 1, wherein the first part of the subframe is transmitted before the second part.

3. A wireless communications system according to clause 1 or 2, wherein the group identifier is a RNTI and the encoding of the group control channel is the encoding of CRC bits using the RNTI.

4. A wireless communications system according to any of clauses 1, 2 or 3, wherein the group identifier is determined to be a temporary RNTI assigned to the communications device by one of said base stations.

5. A wireless communications system according to clause 3, wherein the group identifier is deduced from a relationship between a first preamble signature indicated in a random access preamble message received by a base station from a terminal and a second preamble signature indicated in a random access response message transmitted by the base station to the terminal in reply to the random access preamble message.

6. A wireless communications system according to clause 5, wherein the random access response message transmitted by the base station in reply to the random access preamble message includes a reserved RNTI where a cell RNTI is expected, and wherein the group identifier is determined by the terminal to be the reserved RNTI by virtue of the presence of the reserved RNTI in the random access response message.

7. A wireless communications system according to any of clauses 1 to 6, wherein the second control region is a narrow band control region, having a second bandwidth which is less than the bandwidth of the first control region.

8. A wireless communications system according to clause 7, wherein said second control region is a region within a third region, the third region being distinct from the first control region, the third region having a third bandwidth which is less than the bandwidth of the first control region and greater than or equal to the second bandwidth, the third region being configured for communicating data to one or more of the mobile terminals.

9. A wireless communications system according to clause 8, wherein said third region includes a fourth region, the fourth region having a fourth bandwidth which is less than the third bandwidth, the fourth region being configured for communicating further control data to one or more of the mobile terminals.

10. A wireless communications system according to clause 9, wherein said fourth region extends across substantially all of the duration of the second part of the subframe external to the second control region.

11. A wireless communications system according to any of clauses 1 to 10,
wherein the control channel resource elements of the group control channel have an associated aggregation level, wherein a second subset of said control channel resource elements in the first control region provide at least one further control channel, the control channel resource elements of the or each further control channel having an associated further aggregation level, and wherein said aggregation level is a function of at least one of the further aggregation levels.

12. A wireless communications system according to any of clauses 1 to 11, wherein the control channel resource elements of the group control channel have an associated aggregation level, and wherein the aggregation level is broadcast.

13. A wireless communications system according to any of clauses 1 to 12, wherein the control channel resource elements of the group control channel have an associated aggregation level, wherein the aggregation level is determined by the base station according to feedback information from the mobile terminals, and wherein the feedback information corresponds to acknowledgement of receipt.

14. A wireless communications system according to clause 13, wherein the feedback information is the result of a comparison between an expected rate of receipt of acknowledgements and a detected rate of receipt of acknowledgements.

15. A network element for a mobile communications network for transmitting data to and/or receiving data from mobile terminals, the network element comprising:

a transmitter and a receiver configured to provide a wireless access interface for communicating data to and/or from the mobile terminals, the wireless access interface providing a plurality of communications resource elements across a first frequency range, wherein the wireless access interface provided by the network element includes a plurality of time divided sub-frames, and at least one of the sub-frames includes:

a first control region in a first part of the sub-frame for communicating first signalling information to one or more of the mobile terminals, the first control region including a plurality of control channel resource elements, a first subset of said control channel resource elements providing a group control channel, the group control channel being associated with a group identifier and at least partially encoded using the group identifier; and a second control region in a second part of the sub-frame, distinct from the first part of the sub-frame, the second control region being for communicating second signalling information to a predetermined group of the mobile terminals, and wherein the group control channel contains information indicative of the location of the second control region, said information being accessible by applying the group identifier to the group control channel and each of the predetermined group of mobile terminals using the same group identifier.

16. A network element according to clause 15, wherein the first part of the subframe is transmitted before the second part.

17. A network element according to clause 15 or 16, wherein the group identifier is a RNTI and the encoding of the group control channel is the encoding of CRC bits using the RNTI.

18. A network element according to any of clauses 15, 16 or 17, wherein the group identifier is determined to be a temporary RNTI assigned to the communications device by one of said base stations.

19. A network element according to clause 17, wherein the group identifier is deduced from a relationship between a first preamble signature indicated in a random access preamble message received by a base station from a terminal and a second preamble signature indicated in a random access response message transmitted by the base station to the terminal in reply to the random access preamble message.

20. A network element according to clause 19, wherein the random access response message transmitted by the base station in reply to the random access preamble message includes a reserved RNTI where a cell RNTI is expected, and wherein the group identifier is determined by the terminal to be the reserved RNTI by virtue of the presence of the reserved RNTI in the random access response message.

21. A network element according to any of clauses 15 to 20, wherein the second control region is a narrow band control region, having a second bandwidth which is less than the bandwidth of the first control region.

22. A network element according to clause 21, wherein said second control region is a region within a third region, the third region being distinct from the first control region, the third region having a third bandwidth which is less than the bandwidth of the first control region and greater than or equal to the second bandwidth, the third region being configured for communicating data to one or more of the mobile terminals.

23. A network element according to clause 22, wherein said third region includes a fourth region, the fourth region having a fourth bandwidth which is less than the third bandwidth, the fourth region being configured for communicating further control data to one or more of the mobile terminals.

24. A network element according to clause 23, wherein said fourth region extends across substantially all of the duration of the second part of the subframe external to the second control region.

REFERENCES

[1] ETSI TS 122 368 V10.530 (2011-07)/3GPP TS 22.368 version 10.5.0 Release 10)
[2] UK patent application GB 1101970.0
[3] UK patent application GB 1101981.7
[4] UK patent application GB 1101966.8
[5] UK patent application GB 1101983.3
[6] UK patent application GB 1101853.8
[7] UK patent application GB 1101982.5
[8] UK patent application GB 1101980.9
[9] UK patent application GB 1101972.6
[10] UK patent application GB 1113801.3
[11] UK patent application GB 1121767.6

The invention claimed is:

1. A wireless communications system for transmitting data to and/or receiving data from mobile terminals, the wireless communications system comprising:

one or more base stations, each of which includes a transmitter and a receiver configured to provide a wireless access interface for communicating data to and/or from the mobile terminals, the wireless access interface providing a plurality of communications resource elements across a first frequency range, wherein the wireless access interface provided by the one or more base stations includes a plurality of time divided sub-frames, and each one of the sub-frames includes:

a first control region in a first part of the sub-frame for communicating first signaling information to one or more of the mobile terminals, the first control region including a plurality of control channel resource elements, a first subset of said control channel resource elements providing a group control channel, the group control channel being associated with a group identifier and at least partially encoded using the group identifier, and a second control region in a second part of the sub-frame, distinct from the first part of the sub-frame, the second control region being for communicating second signaling information to a predetermined group of the mobile terminals, the second control region spanning, in time, an entirety of the sub-frame not occupied by the first control region, the second control region occupying a same predetermined number of highest frequency channel resource elements in each of the sub-frames, the group control channel contains information indicative of the location of the second control region, said information being accessible by applying the group identifier to the group control channel and each of the predetermined group of mobile terminals use the group identifier, the group identifier is a radio network temporary identifier (RNTI) and the encoding of the group control channel is the encoding of cyclical redundancy code (CRC) bits using the RNTI, and the group identifier is deduced from a relationship between a first preamble signature indicated in a random access preamble message received by a base station from a terminal and a second preamble signature indicated in a random access response message transmitted by the base station to the terminal in reply to the random access preamble message.

2. The wireless communications system as claimed in claim 1, wherein the first part of the sub-frame is transmitted before the second part.

3. The wireless communications system as claimed in claim 1, wherein the RNTI is assigned by one of said base stations.

4. The wireless communications system as claimed in claim 1, wherein the random access response message transmitted by the base station in reply to the random access preamble message includes a reserved RNTI where a cell RNTI is expected, and wherein the group identifier is determined by the terminal to be the reserved RNTI by virtue of the presence of the reserved RNTI in the random access response message.

5. The wireless communications system as claimed in claim 1, wherein the second control region is a narrow band control region, having a second bandwidth which is less than the bandwidth of the first control region.

6. The wireless communications system as claimed in claim 5, wherein said second control region is a region within a third region, the third region being distinct from the first control region, the third region having a third bandwidth which is less than the bandwidth of the first control region and greater than or equal to the second bandwidth, the third region being configured for communicating data to one or more of the mobile terminals.

7. The wireless communications system as claimed in claim 6, wherein said third region includes a fourth region, the fourth region having a fourth bandwidth which is less than the third bandwidth, the fourth region being configured for communicating further control data to one or more of the mobile terminals.

8. The wireless communications system as claimed in claim 7, wherein said fourth region extends across all of the duration of the second part of the sub-frame external to the second control region.

9. The wireless communications system as claimed in claim 1,
wherein the control channel resource elements of the group control channel have an associated aggregation level,
wherein a second subset of said control channel resource elements in the first control region provide at least one further control channel, the control channel resource elements of the or each further control channel having an associated further aggregation level, and
wherein said aggregation level is a function of at least one of the further aggregation levels.

10. The wireless communications system as claimed in claim 1,
wherein the control channel resource elements of the group control channel have an associated aggregation level, and
wherein the aggregation level is broadcast.

11. The wireless communications system as claimed in claim 1,
wherein the control channel resource elements of the group control channel have an associated aggregation level,
wherein the aggregation level is determined by the base station according to feedback information from the mobile terminals, and
wherein the feedback information corresponds to acknowledgement of receipt.

12. The wireless communications system as claimed in claim 11,
wherein the feedback information is the result of a comparison between an expected rate of receipt of acknowledgements and a detected rate of receipt of acknowledgements.

13. A network element for a mobile communications network for transmitting data to and/or receiving data from mobile terminals, the network element comprising:

a transmitter and a receiver configured to provide a wireless access interface for communicating data to and/or from the mobile terminals, the wireless access interface providing a plurality of communications resource elements across a first frequency range, wherein the wireless access interface provided by the network element includes a plurality of time divided sub-frames, and each one of the sub-frames includes:

a first control region in a first part of the sub-frame for communicating first signaling information to one or more of the mobile terminals, the first control region including a plurality of control channel resource elements, a first subset of said control channel resource elements providing a group control channel, the group control channel being associated with a group identifier and at least partially encoded using the group identifier, and a second control region in a second part of the subframe, distinct from the first part of the sub-frame, the second control region being for communicating second signaling information to a predetermined group of the mobile terminals, the second control region spanning, in time, an entirety of the sub-frame not occupied by the first control region, the second control region occupying a same predetermined number of highest frequency channel resource elements in each of the sub-frames, the group control channel contains information indicative of the location of the second control region, said information being accessible by applying the group identifier to the group control channel and each of the predetermined group of mobile terminals uses the group identifier, the group identifier is a radio network temporary identifier (RNTI) and the encoding of the group control channel is the encoding of cyclical redundancy code (CRC) bits using the RNTI, and the group identifier is deduced from a relationship between a first preamble signature indicated in a random access preamble message received by a base station from a terminal and a second preamble signature indicated in a random access response message transmitted by the base station to the terminal in reply to the random access preamble message.

14. The network element as claimed in claim 13, wherein the first part of the subframe is transmitted before the second part.

15. The network element as claimed in claim 13, wherein the RNTI is assigned by one of a plurality of base stations.

16. The network element as claimed in claim 13, wherein the random access response message transmitted by the base station in reply to the random access preamble message includes a reserved RNTI where a cell RNTI is expected, and wherein the group identifier is determined by the terminal to be the reserved RNTI by virtue of the presence of the reserved RNTI in the random access response message.

17. The network element as claimed in claim 13, wherein the second control region is a narrow band control region, having a second bandwidth which is less than the bandwidth of the first control region.

18. The network element as claimed in claim 17, wherein said second control region is a region within a third region, the third region being distinct from the first control region, the third region having a third bandwidth which is less than the bandwidth of the first control region and greater than or equal to the second bandwidth, the third region being configured for communicating data to one or more of the mobile terminals.

19. The network element as claimed in claim 18, wherein said third region includes a fourth region, the fourth region having a fourth bandwidth which is less than the third bandwidth, the fourth region being configured for communicating further control data to one or more of the mobile terminals.

20. The network element as claimed in claim 19, wherein said fourth region extends across all of the duration of the second part of the subframe external to the second control region.

21. A method of operating a wireless communications system for transmitting data to and/or receiving data from mobile terminals, the method comprising:

providing a plurality of communications resource elements across a first frequency range, wherein the plurality of communications resource elements are arranged in a plurality of time divided sub-frames, and each one of the sub-frames includes:

a first control region in a first part of the sub-frame for communicating first signaling information to one or more of the mobile terminals, the first control region including a plurality of control channel resource elements, a first subset of said control channel resource elements providing a group control channel, the group control channel being associated with a group identifier and at least partially encoded using the group identifier, and a second control region in a second part of the sub-frame, distinct from the first part of the sub-frame, the second control region being for communicating second signaling information to a predetermined group of the mobile terminals, the second control region spanning, in time, an entirety of the sub-frame not occupied by the first control region, the second control region occupying a same predetermined number of highest frequency channel resource elements in each of the sub-frames, the group control channel contains information indicative of the location of the second control region, said information being accessible by applying the group identifier to the group control channel and each of the predetermined group of mobile terminals uses the group identifier, the group identifier is a radio network temporary identifier (RNTI) and the encoding of the group control channel is the encoding of cyclical redundancy code (CRC) bits using the RNTI, and the group identifier is deduced from a relationship between a first preamble signature indicated in a random access preamble message received by a base station from a terminal and a second preamble signature indicated in a random access response message transmitted by the base station to the terminal in reply to the random access preamble message.

* * * * *